United States Patent
Simon et al.

(10) Patent No.: US 7,187,788 B2
(45) Date of Patent: Mar. 6, 2007

(54) METHOD AND SYSTEM FOR ENHANCING PORTRAIT IMAGES THAT ARE PROCESSED IN A BATCH MODE

(75) Inventors: Richard A. Simon, Rochester, NY (US); Tomasz Matraszek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/448,388

(22) Filed: Jun. 7, 2006

(65) Prior Publication Data
US 2006/0228038 A1 Oct. 12, 2006

Related U.S. Application Data

(63) Continuation of application No. 11/343,833, filed on Jan. 31, 2006, which is a continuation of application No. 10/376,562, filed on Feb. 28, 2003, now Pat. No. 7,039,222.

(51) Int. Cl.
*G06K 9/00* (2006.01)
*G06K 9/40* (2006.01)
(52) U.S. Cl. ..................... 382/118; 382/254; 348/606
(58) Field of Classification Search ............... 382/118, 382/254–275; 348/606–624
See application file for complete search history.

(56) References Cited

U.S. PATENT DOCUMENTS 5,430,809 A * 7/1995 Tomitaka .................... 382/173

(Continued)

FOREIGN PATENT DOCUMENTS

EP 0 677 971 A2 10/1995

(Continued)

OTHER PUBLICATIONS

"Gender Classification & Gesture Recognition" by B. Moghaddam and M.H. Yang. Proc. of 4th IEEE Int'l Conf. on Face & Gesture Recognition, Mar. 2000.

(Continued)

*Primary Examiner*—Matthew C. Bella
*Assistant Examiner*—Aaron Carter
(74) *Attorney, Agent, or Firm*—Robert L. Walker

(57) ABSTRACT

A batch processing method for enhancing an appearance of a face located in a digital image, where the image is one of a large number of images that are being processed through a batch process, comprises the steps of: (a) providing a script file that identifies one or more original digital images that have been selected for enhancement, wherein the script file includes an instruction for the location of each original digital image; (b) using the instructions in the script file, acquiring an original digital image containing one or more faces; (c) detecting a location of facial feature points in the one or more faces, said facial feature points including points identifying salient features including one or more of skin, eyes, eyebrows, nose, mouth, and hair; (d) using the location of the facial feature points to segment the face into different regions, said different regions including one or more of skin, eyes, eyebrows, nose, mouth, neck and hair regions; (e) determining one or more facially relevant characteristics of the different regions; (f) based on the facially relevant characteristics of the different regions, selecting one or more enhancement filters each customized especially for a particular region and selecting the default parameters for the enhancement filters; (g) executing the enhancement filters on the particular regions, thereby producing an enhanced digital image from the original digital image; (h) storing the enhanced digital image; and (i) generating an output script file having instructions that indicate one or more operations in one or more of the steps (c)–(f) that have been performed on the enhanced digital image.

16 Claims, 23 Drawing Sheets

U.S. PATENT DOCUMENTS

| | | | | |
|---|---|---|---|---|
| 5,629,752 A * | 5/1997 | Kinjo | ......................... | 355/35 |
| 5,710,833 A * | 1/1998 | Moghaddam et al. | ....... | 382/228 |
| 5,710,839 A | 1/1998 | Cok | ......................... | 382/264 |
| 5,781,650 A | 7/1998 | Lobo et al. | ................. | 382/118 |
| 5,835,616 A | 11/1998 | Lobo et al. | ................. | 382/118 |
| 5,933,543 A | 8/1999 | Cok | ......................... | 382/264 |
| 5,960,099 A | 9/1999 | Hayes, Jr. et al. | ......... | 382/118 |
| 5,974,189 A | 10/1999 | Nicponski | ................. | 382/254 |
| 5,990,901 A | 11/1999 | Lawton et al. | ............. | 345/429 |
| 6,101,000 A | 8/2000 | Murray et al. | ............... | 358/1.9 |
| 6,104,839 A | 8/2000 | Cok et al. | ................... | 382/254 |
| 6,160,923 A | 12/2000 | Lawton et al. | ............. | 382/275 |
| 6,181,836 B1 | 1/2001 | Delean | ...................... | 382/302 |
| 6,263,101 B1 * | 7/2001 | Klein | ......................... | 382/162 |
| 6,690,822 B1 * | 2/2004 | Chen et al. | ................. | 382/162 |
| 6,711,286 B1 * | 3/2004 | Chen et al. | ................. | 382/162 |
| 6,895,124 B1 | 5/2005 | Kira et al. | | |
| 6,940,545 B1 * | 9/2005 | Ray et al. | ................ | 348/222.1 |
| 2002/0081003 A1 | 6/2002 | Sobel | ......................... | 382/118 |
| 2002/0110274 A1 | 8/2002 | Yamamoto | | |
| 2003/0053663 A1 * | 3/2003 | Chen et al. | ................. | 382/117 |
| 2003/0063102 A1 | 4/2003 | Rubinstenn et al. | | |

FOREIGN PATENT DOCUMENTS

| | | |
|---|---|---|
| EP | 1 030 267 A1 | 8/2000 |
| EP | 1 134 701 A2 | 9/2001 |
| EP | WO 01/77976 A2 | 10/2001 |
| WO | WO 00/76398 A1 | 12/2000 |
| WO | WO 01/75796 | 10/2001 |

OTHER PUBLICATIONS

"A Statistical Model for 3D Object Detection Applied to Faces and Cars" by Henry Schneiderman. Ph.D. Thesis. Robotics Institute, Carnegie Mellon University, May 2000.

"Automatic interpretation and coding of face images using flexible models" by A. Lanitis, C.J. Taylor and T.F. Cootes. IEEE Trans. on PAMI, vol. 19, No. 7, pp. 743-756, 1997.

"Visual Communication at Very Low Data Rates" by D.E. Pearson and J.A. Robinson. Proceedings of the IEEE, vol. 73, No. 4, Apr. 1985.

"Feature-Based Image Metamorphosis" by T. Beier and S. Neely. Computer Graphics, 26(2): 35-42, New York, NY, Jul. 1992. Proceedings of SIGGRAPH '92.

Gloria Chow et al., entitled "Towards A System For Automatic Facial Feature Detection", Dec. 1, 1993, pp. 1739-1755.

Chung-Ling Huang et al., entitled "Human Facial Feature Extraction For Face Interpretation and Recognition", Dec. 1, 1992, pp. 1435-1441.

Scott T. Acton et al., entitled "Nonlinear Image Estimation Using Piecewise and Local Image Models", Jul. 1998, pp. 979-991.

* cited by examiner

```xml
<AutoRetouch>
    <outputfile type>sameasinput</outputfiletype>
        <jpegquality>90</jpegquality>
    <deleteonaccept>Yes</deleteonaccept>
<skinenhancer>
    <status>Off</status>
</skinenhancer>
<textureenhancer>
    <status>On</status>
    <fine>5</fine>
    <coarse>4</coarse>
</textureenhancer>
<eyeopener>
    <status>On</status>
    <amount>8</amount>
</eyeopener>
<convert>
    <source>c:\hotfolder\processed\00010010.jpg</source>
</convert>
<textureenhancer>
    <status>Off</status>
</textureenhancer>
<whitener>
    <status>On</status>
    <eyes>6</eyes>
    <teeth>7</teeth>
</whitener>
<convert>
    <source>c:\hotfolder\processed\00010019.jpg</source>
    <savesource>c:\hotfolder\processed\00010019orig.jpg</savesource>
</convert>
<eyeopener>
    <status>Off</status>
</eyeopener>
<skinenhancer>
    <status>On</status>
    <smooth>4</smooth>
    <shadow>3</shadow>
</skinenhancer>
<textureenhancer>
    <status>On</status>
    <fine>5</fine>
    <coarse>4</coarse>
</textureenhancer>
<convert>
    <source>c:\hotfolder\processed\00010051.jpg</source>
    <dest>c:\hotfolder\result\00010051.jpg</dest>
</convert>
</AutoRetouch>
```

Fig. 2C

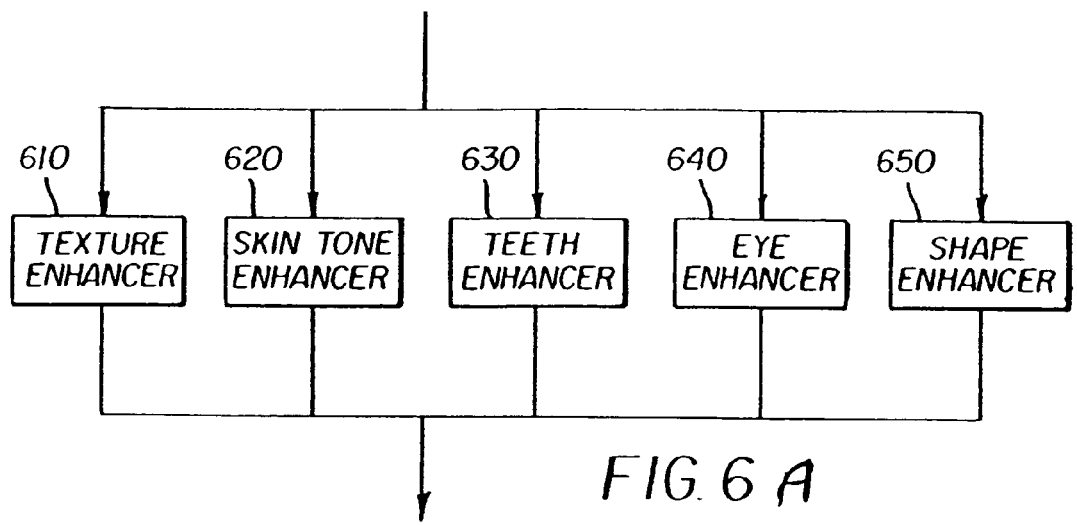
FIG. 6A
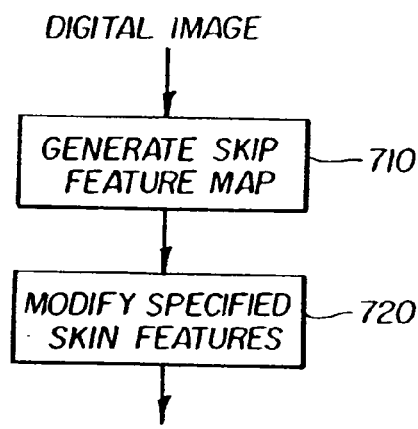
FIG. 7A
FIG. 7B 20 a)

20 b)

METHOD AND SYSTEM FOR ENHANCING PORTRAIT IMAGES THAT ARE PROCESSED IN A BATCH MODE

CROSS-REFERENCE TO RELATED APPLICATION

This is a continuation of pending U.S. Ser. No. 11/343,833 filed Jan. 31, 2006, which in turn, is a continuation of U.S. Ser. No. 10/376,562 filed Feb. 28, 2003, now U.S. Pat. No. 7,039,222.

Reference is made to commonly assigned, co-pending application Ser. No. 11/448,268, filed Jun. 7, 2006, entitled METHOD AND SYSTEM FOR ENHANCING PORTRAIT IMAGES THAT ARE PROCESSED IN A BATCH MODE, in the name of Richard A. Simon and Tomasz A. Matraszek.

Reference is made to commonly assigned, co-pending application Ser. No. 11/343,833, filed Jun. 7, 2006, entitled METHOD AND SYSTEM FOR ENHANCING PORTRAIT IMAGES THAT ARE PROCESSED IN A BATCH MODE, in the name of Richard A. Simon and Tomasz A. Matraszek.

Reference is made to commonly assigned, co-pending application Ser. No. 11/448,949, filed Jun. 7, 2006, entitled METHOD AND SYSTEM FOR ENHANCING PORTRAIT IMAGES THAT ARE PROCESSED IN A BATCH MODE, in the name of Richard A. Simon and Tomasz A. Matraszek.

Reference is made to commonly assigned, co-pending application Ser. No. 11/448,507, filed Jun. 7, 2006, entitled METHOD AND SYSTEM FOR ENHANCING PORTRAIT IMAGES THAT ARE PROCESSED IN A BATCH MODE, in the name of Richard A. Simon and Tomasz A. Matraszek.

FIELD OF THE INVENTION

The present invention relates generally to the field of digital image processing, and in particular to the creation of improved imaging products derived from portrait-type images of human subjects.

BACKGROUND OF THE INVENTION

For centuries, only the wealthy or privileged classes of society could afford to employ the skilled artisans who labored to produce a fine likeness in painting, sculpture, and drawing. In many cases, portraiture served a purpose greater than the simple creation of an acceptable likeness of reality. In subtle or overt ways, the artist's work would interact with the desires and intentions of the subjects. A second category of artistic license involved improvement on reality. Thus, subjects were rendered in such a way as to minimize their physical imperfections and to present the most attractive possible appearance.

In modern society, portraiture is no longer the exclusive domain of the wealthy and powerful. The advent of photography into all levels of society has rendered creation of portrait images to be an ubiquitous part of many of life's major events. Weddings, graduations, birthdays, arrival of a baby—all of these events, and more—are commonly captured with relatively standardized portrait images in western cultures. While the state of technology enables individual amateurs to capture and even enhance images such as these, there still exists a class of professional photographers that provide creation of higher-quality portrait images. Not surprisingly, the goals of the portraitist remain the same as in bygone centuries—to present the subject in the most pleasing possible way. In essence, the subject wants to be seen as they wish they were, not as they really are.

In response to the desire for people to be seen as they wish they are, and not the way they really are, professional photographers resort to retouching the portrait image to give people their preferred appearance. Retouching involves changing a photo image in some way that was not captured or depicted in the original photographic image. One of the goals of retouching a portrait image is to make a person look better by removing temporary imperfections such as blemishes or dark circles under the eyes or permanent imperfections such as moles or wrinkles, while still maintaining the personality of the individual. Removing facial blemishes, moles and scars, softening lines and wrinkles, decreasing bags under the eyes, whitening teeth and the whites of the eyes are examples of retouching performed to improve or enhance the appearance of an individual in a-portrait image.

Before the advent of the digital age, retouching of images were performed on either the negative or printed image by modifying the image using dyes to mask or change imperfections in the portrait image. Now that digital image capture devices are routinely available, the preferred method of retouching is done via digital imaging techniques performed on the captured digital images. Digital methods allow enhancements to be performed that were either extremely hard to do or previously impossible to perform on the analogue image. Image editing software such as Adobe Photoshop® can be used to refine portraits by removing blemishes, straightening noses, balancing eyes and applying digital make-up.

Improvements in computer technology and image processing algorithms are enabling new classes of automated and semi-automated image enhancements. Relating to the subject of portrait images, relevant technological developments include face detection and recognition, facial feature detection and masking, face re-posing, and red-eye detection and correction.

In published PCT Patent Application WO 00/76398 A1, "Skin Imaging Analysis Systems and Methods", Hillebrand et al. disclose a system that can detect skin defects and calculate a skin severity index. This system is aimed towards the cosmetic and skin care market. The system can also simulate improvements to the defected skin areas that would be realized upon the use of a recommended treatment or product that eliminates or hides the skin defect. The skin defects are detected using color information and standard morphing techniques are used to simulate improvements in the defected skin areas.

In published European Patent Application EP 1 030 276 A1, "Method of Correcting Face Image, Makeup Simulation Method, Makeup Method, Makeup Supporting Device and Foundation Transfer Film", Utsugi describes a method for preparing an ideal post-makeup face through image processing based on a desirable face or a model face. The technique involves making highlighted areas, and the shapes of the eyebrows, the eyelines, and the lip line closer to that of a desirable face or a model face within a range where modification by makeup is possible.

The drawback of such systems, especially for batch portraiture systems as used, e.g., for weddings, graduations, school and sports pictures, birthdays, arrival of a baby, etc., is the intense interaction required with the customer to input preferences and evaluate results. For example, in Utsugi the makeup customer's presence is required to settle on the model face, e.g., selected from the faces of popular talents, actresses or actors, and on the various adjustments made to reach the model face. Moreover, a skilled operator is required to work with the customer to produce an acceptable result.

Even with the advent of digital imaging, therefore, retouching portraits is a craft unto itself and to this day remains more of an art form than a science. In addition, the process of retouching portrait images is a highly manual and time consuming process performed by skilled operators. It therefore would be advantageous to develop a system that uses automated and semi-automated portrait image enhancement methods to enable the facile retouching of portraits. The present invention solves the above mentioned shortcomings of the current art by providing methods and system for automated enhancement of the appearance of the human subjects in images.

SUMMARY OF THE INVENTION

The present invention is directed to overcoming one or more of the problems set forth above. Briefly summarized, according to one aspect of the present invention, a batch processing method for enhancing an appearance of a face located in a digital image, where the image is one of a large number of images that are being processed through a batch process, comprises the steps of: (a) providing a script file that identifies one or more original digital images that have been selected for enhancement, wherein the script file includes an instruction for the location of each original digital image; (b) using the instructions in the script file, acquiring an original digital image containing one or more faces; (c) detecting a location of facial feature points in the one or more faces, said facial feature points including points identifying salient features including one or more of skin, eyes, eyebrows, nose, mouth, and hair; (d) using the location of the facial feature points to segment the face into different regions, said different regions including one or more of skin, eyes, eyebrows, nose, mouth, neck and hair regions; (e) determining one or more facially relevant characteristics of the different regions; (f) based on the facially relevant characteristics of the different regions, selecting one or more enhancement filters each customized especially for a particular region and selecting the default parameters for the enhancement filters; (g) executing the enhancement filters on the particular regions, thereby producing an enhanced digital image from the original digital image; (h) storing the enhanced digital image; and (i) generating an output script file having instructions that indicate one or more operations in one or more of the steps (c)–(f) that have been performed on the enhanced digital image.

The advantage of the invention is that it efficiently uses automated and semi-automated portrait image enhancement methods in a batch process to enable the retouching of portraits without requiring skilled operator intervention to make and supervise the retouching corrections. Thus, the highly manual and time consuming processes performed by skilled operators is avoided and the retouching method may be implemented on a batch process.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6A is a diagram of the ensemble of enhancement filters used in the system illustrated in the flowcharts of FIGS. 2A and 2B.

FIG. 7A is a flowchart for a skin texture enhancing filter shown in FIG. 6.

FIG. 7B is a diagram of a pixel neighborhood comprising the valley edge filter kernal used by the skin texture enhancing filter.

DETAILED DESCRIPTION OF THE INVENTION

Because image processing systems employing facial feature detection and feature enhancement are well known, the present description will be directed in particular to attributes forming part of, or cooperating more directly with, method and system in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. As a matter of nomenclature, in the description of the present invention, there is reference to enhancement filters as methods that enhance the visual appearance of a face in a digital image. For example, an eye enhancement filter is a method of enhancing the whiteness and/or iris color of the eye.

If the invention is implemented as a computer program, the program may be stored in conventional computer readable storage medium, which may comprise, for example; magnetic storage media such as a magnetic disk (such as a floppy disk or a bard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1A:
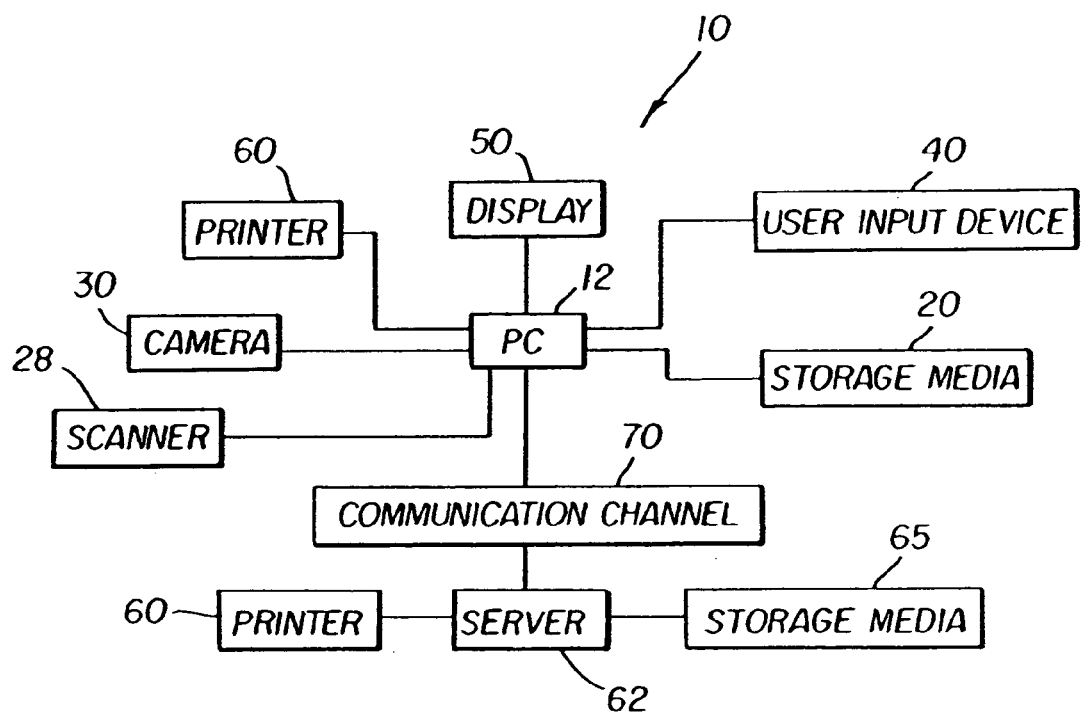
FIGS. 1A and 1B are diagrams of a system for practicing the invention and a graphical user interface for use with the system, respectively.

FIG. 1A illustrates a system 10 that is useful in practicing the present invention. The system 10 includes a personal computer PC 12 containing a central processing unit (CPU) that can execute a set of predefined steps in carrying out the method of the present invention. A digital storage media 20 is also provided in connection with PC 12 for storing digital images. The digital storage media 20 can include different types of devices, such as RAM, ROM, hard and floppy drives, etc. The digital storage media 20 can also be used to locally store the generated enhanced images. In addition, digital image capture devices such as a scanner 28 and a digital camera 30, which are additional sources of digital images, can also be provided to the computer 12. However, it is to be understood that the digital images may be obtained from any source. A user interacts with the computer 12 via input devices 40, such as a mouse and/or keyboard, and a display monitor 50 that is connected to the computer 12. The system 10 may also contain a device such as a printer 34 for locally outputting the images. Typically, the above components would reside on, in the sense of being directly connected to, the PC 12.

Alternatively, the above components do not have to all reside on the host computer 12 but can reside on a server 62 that can be connected to a client PC 12 via a communication network 70. The server may also contain a central processing unit (CPU) that can execute a set of predefined steps in carrying out the method of the present invention. The server may also be connected to a storage media 65 and one or more printers 60. This can enable images to be remotely acquired, stored and printed via the communication network 70 using the storage media 65 and printer 60 connected to the server 62. The software for carrying out the present invention is typically stored on storage media 20. Alternatively, this software can be downloaded from the server via the communication network 70. The software for carrying out the present invention can be executed either on the client using the CPU contained in the PC 12 or on the server side using the CPU contained in the server 62. The communication network 70 may comprise a private network, such as a local area network (LAN), or a public network, such as the Internet that can be accessed by an individual using an Internet Service Provider (ISP). As is customary in such networks, the remote network service provider may also be accessed by a customer using a retail kiosk or any other appropriate communication device.

Figure 1B:
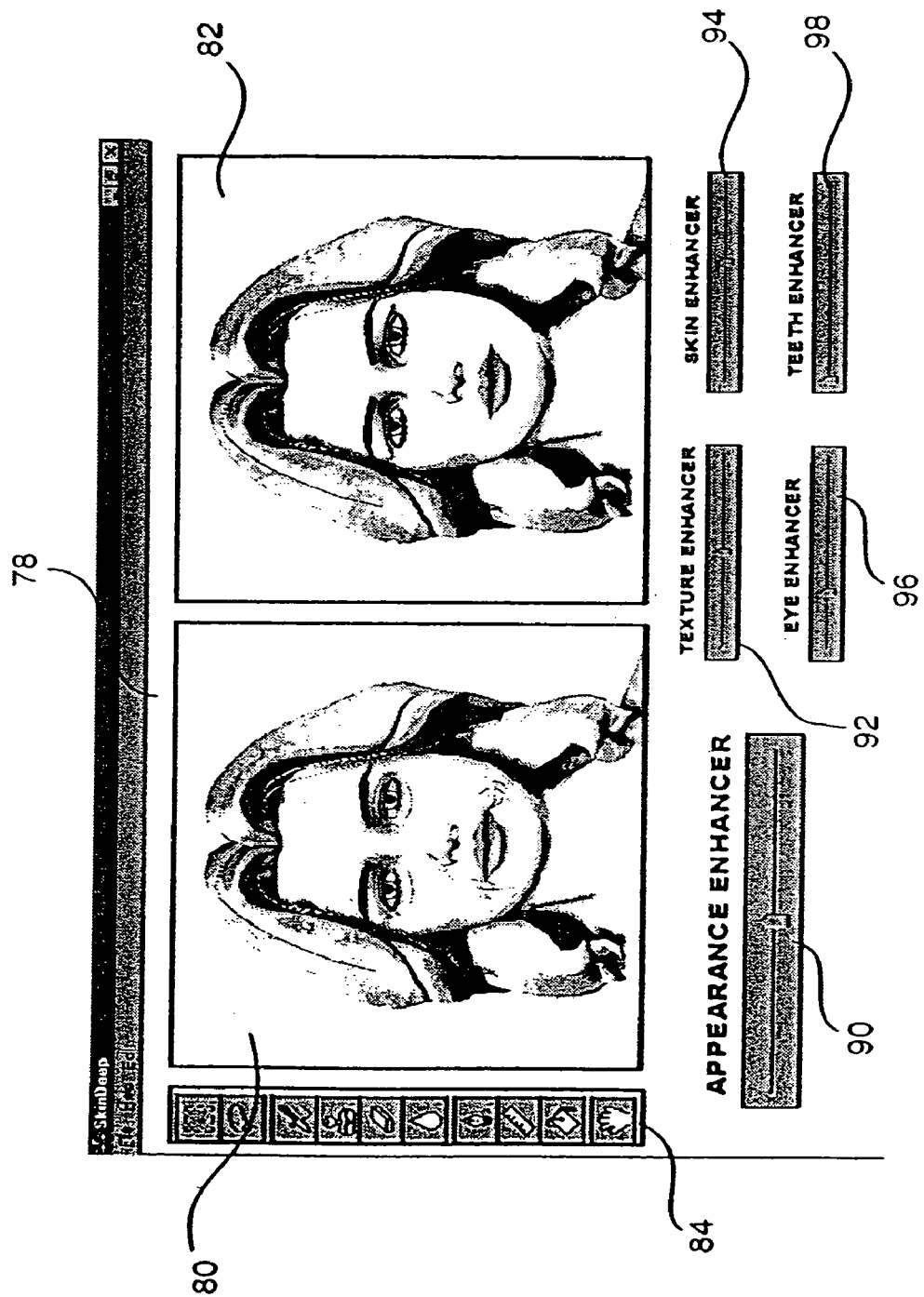

FIG. 1B shows an example of Graphic User Interface (GUI) for the interactive software that carries out the present invention; the software runs locally on the system 10 or remotely on the server 62, and produces a GUI screen 78 as shown in FIG. 1B. The user launches the software and downloads an image to be enhanced. When the image is downloaded, the Graphic User Interface screen 78 is displayed on the display 50. An image 80 on the left of the GUI screen 78 is the original downloaded image with the face to be enhanced by the method of the present invention. On the right, an image 82 with the enhanced face is presented. In one embodiment, when the image is downloaded, the user clicks on the eyes of the face 80 to be enhanced. In response, as will be described in detail later, the system automatically finds facial feature points and segments the face into different features (e.g., eyes, eyebrows, etc.) and a neck region. The system sets up default parameters and applies all enhancement filters in a predefined order to the original image.

The resulting image 82 is displayed on the right side of the GUI screen 78. The sliders 90, 92, 94, 96 and 98 allow the user to interactively change parameters of different enhancement filters. The initial positions of the sliders correspond to the default values set up automatically by the system. The main appearance enhancer slider 90 combines all component enhancement sliders. The component sliders include a texture enhancer slider 92, a skin enhancer slider 94, an eye enhancer slider 96 and a teeth enhancer slider 98. The texture enhancement slider 92 controls parameters of the texture enhancement filter. The skin enhancer slider 94 controls parameters of the skin tone enhancement filter. The eye enhancer slider 96 and the teeth enhancer slider 98 control parameters of the eye and teeth whitening filters, respectively. All the enhancement filters are described in detail in the following sections. The minimum and maximum for all sliders are set up to "no enhancement" (e.g., at the left extreme of each slider) and to "maximum enhancement" (e.g., at the right extreme of each slider), respectively.

The user can control the level and look of facial enhancement by using the one global appearance enhancer slider 90 or the separate component sliders 92–98. Whenever the user changes a position of the main appearance enhancer slider 90, the system maps the position of the slider into appropriate parameter values of the enhancement filters and applies all the enhancement filters in the predefined order to the original image. The enhanced image 82 is then displayed on the right side of the GUI screen 78. Whenever the user changes one of the component enhancer sliders 92–98, the system applies all enhancement filters to the original image in the predefined order based on the positions of each component enhancer slider. The enhanced image 82 is then displayed on the right side of the GUI screen 78. Part of the GUI design in the preferred embodiment is the option of modifying facial feature points and a neck region outline. When the user selects that option from the menu "Edit" pulled down from the top bar of the GUI screen 78, the facial feature points and neck region outline points are overlaid on the original image 80 and the user can modify location of the displayed points by using the user input device 40, such as a pointing device. The tool bar 84 contains specific tools the user can use to interact with and modify the displayed images. For example a tool for zooming in and out, a tool for editing feature points, a blending tool to locally blend the original image with the enhanced image, a tool for spatially modifying the results of an enhancement filter, etc.

Figure 2A:
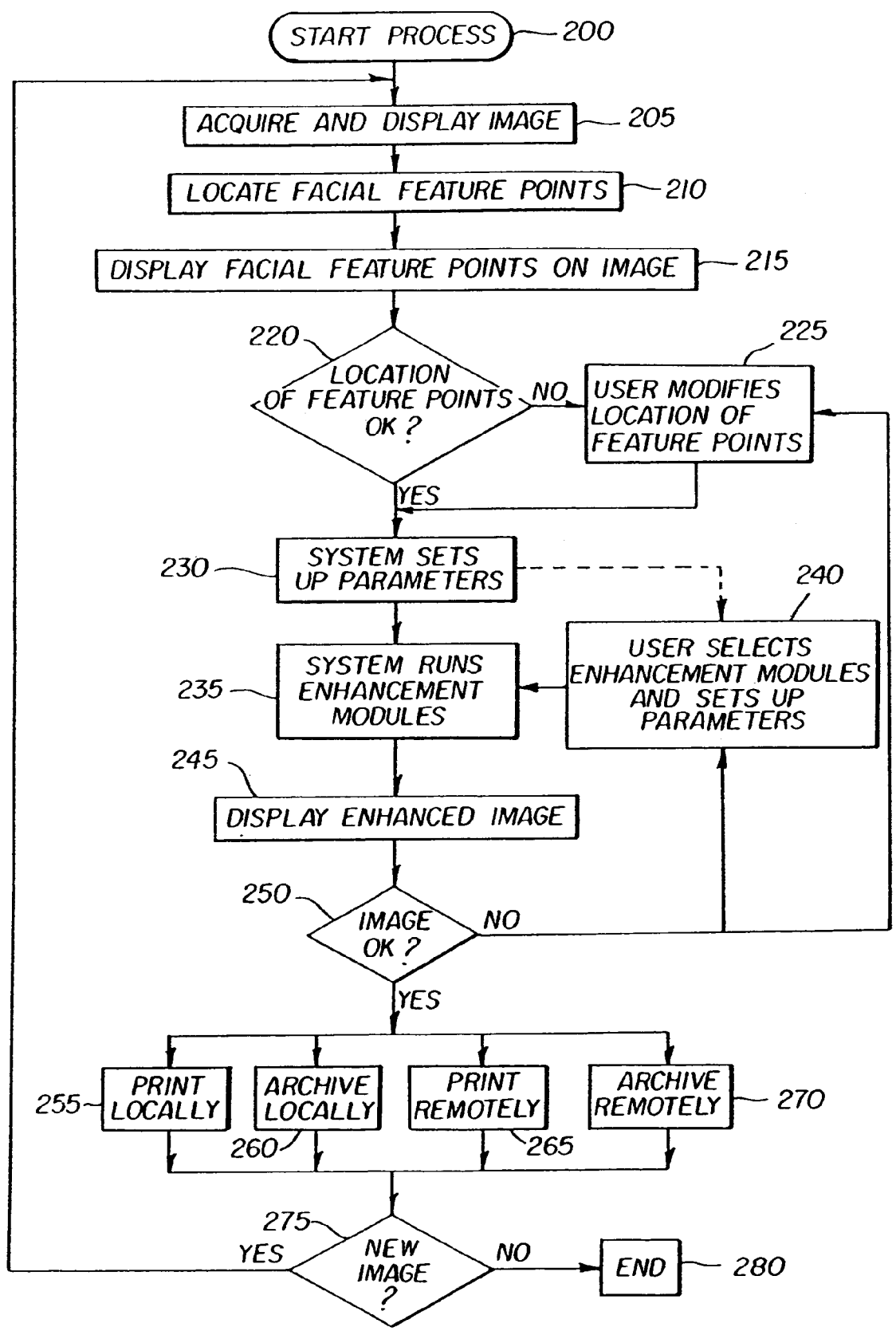
FIG. 2A is a flowchart of an embodiment for implementing the invention with an optional degree of user intervention.

FIG. 2A is a schematic flowchart illustrating one embodiment of the method of enhancing a portrait image according to the present invention. After initiating the process in step 200, a digital image is acquired by the system and then displayed on the display monitor 50 in an acquisition and display step 205. In the present invention, a digital image refers not only to images obtained from photographs, but to digital images obtained without limitation from any source, for example, from a digital camera, scanning of a hardcopy image, or electronically from another source. In a locate step 210, the individual faces in the image are detected and the location of the facial feature points on each face are identified. The process of locating the faces and their associated feature points can be performed manually by the user, or semi-automatically or automatically using image processing techniques. The locations of the facial feature points are used to identify and segment different regions of the face (such as skin, eyes, nose, mouth, hair, etc.) and the neck region. In a display step 215, the facial feature points are overlaid on the image and displayed on the display monitor 50. Optionally, feature points outlining the neck region are displayed as well. If the facial feature points were determined automatically or semi-automatically, the user at a decision step 220 has an opportunity to decide if the feature points need to be adjusted. If the user decides that the feature points need to be adjusted, at a modify step 225 the user can adjust the facial feature points using the input device 40. Optionally, the user can adjust feature points outlining the neck region as well.

At a default setup step 230 the system uses the location of the facial feature points to identify and segment different regions of the face, such as skin, eyes, nose, mouth, hair, facial hair, etc., and determine the appropriate default parameters for the enhancement filters. In the preferred embodiment the neck region is automatically segmented based on location of facial feature points. The method of segmenting a neck region will be described in detail later. Accordingly, in step 230 the system determines the appropriate default parameters for enhancement filters for the neck region as well. Optionally, at this stage the gender and age of the face can be determined manually or automatically using gender and age classification algorithms. An example of automatic gender classification is described in B. Moghaddam and M. H. Yang, "Gender Classification with Support Vector Machines" in *Proc. of 4th IEEE Int'l Conf. On Face & Gesture Recognition*, March 2000, which is incorporated herein by reference. Typical algorithms for age classification operate by performing an analysis of a digital image of a subject's face for particular detailed facial features such as facial feature ratios and wrinkle analysis. An automatic age classifier algorithm useful for the practice of the present invention is disclosed in U.S. Pat. No. 5,781,650 to Lobo and Kwon, which is incorporated herein by reference. Gender and age classification can be used to decide on which enhancement filters should be executed along with gender specific parameters. For example, as a default a larger amount of texture and skin enhancement can be applied to female-faces than to male faces. The preferred default parameters can be determined based on an image class as well. An image class is a class of images similar in terms of type (e.g. portrait), content (e.g. family-portrait or school portrait), resolution and composition. A user can, e.g., check image class by pulling down the "Edit" menu from the top bar of the GUI screen 78 (FIG. 1B), and checking a "Preferences" submenu for a listing of exemplary image classes.

The system then executes the enhancement filters in an execution step 235 using the appropriately chosen parameters. Alternatively, as shown by broken line, the user at a user selection step 240 can decide which enhancement filters should be executed along with the appropriate parameters for the enhancement filters. After the system finishes executing the enhancement filters in the step 235 the enhanced image is displayed in a display 245 on the display monitor 50. At this point the user can decide if the enhanced image is acceptable. If the image is not acceptable, the user can choose either to change the enhancement filters and/or their parameters in the user selection step 240 or adjust the location of the facial feature points in the modify step 225. In one embodiment, the user can choose to sequentially execute different enhancement filters to see the effect a given enhancement filter has on the image. In this embodiment, the user will cycle through steps 240, 235, 245, 250 changing the enhancement filters and parameters until an acceptable result is obtained. If the enhanced image is deemed acceptable in a decision step 250, the user can chose either to locally print in a local print step 255 on the printer 34 or locally archive in a local archive step 260 on storage media 20. Alternatively, if the system is connected to a server 62 via a communication link 70, the user can also choose either to remotely print in a remote print step 265 on the printer 60 or remotely archive in a remote archive step 270 on storage media 65. After the appropriate action has been chosen and completed, the system queries for the presence of a new image (query step 275) and depending on the response, cycles back to the acquire and display step 205 for the next image or ends the process (ending step 280).

Figure 2B:
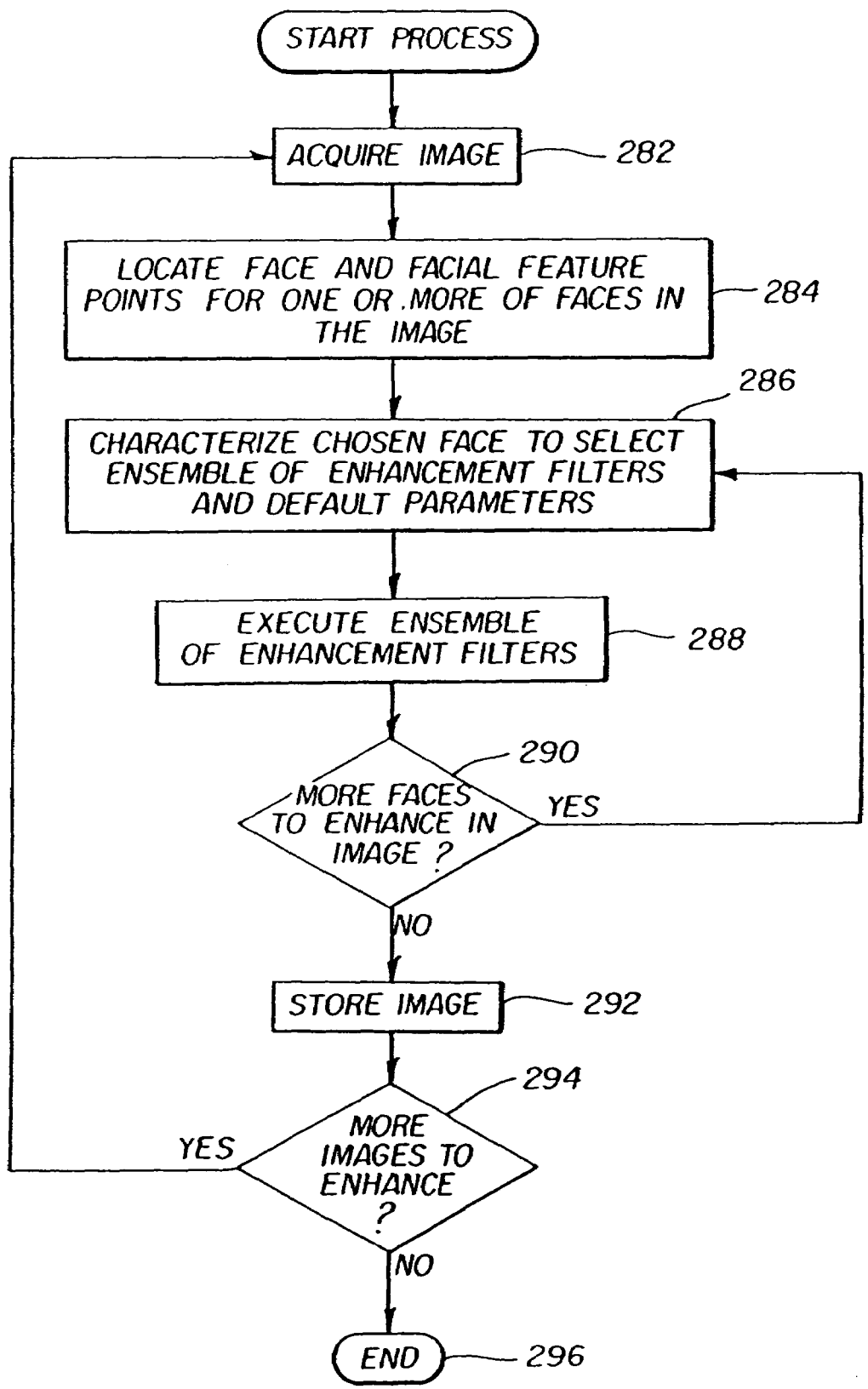
FIG. 2B is a flowchart of an automatic embodiment for implementing the invention in a batch mode without user intervention.
Figure 2:
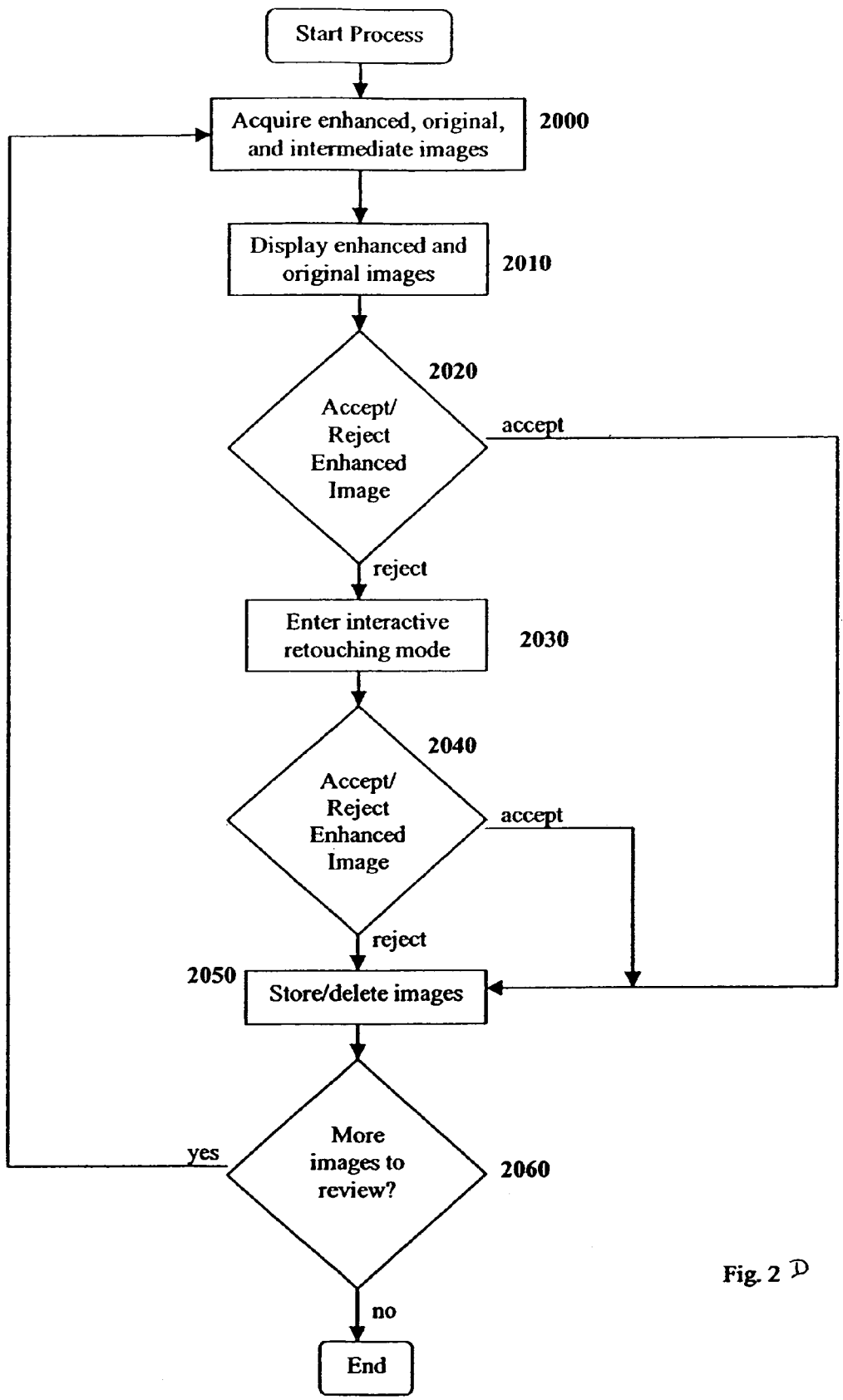
FIG. 2C is an illustration of a script file having instructions for the location and processing of the original digital images in a batch mode.
FIG. 2D is a flowchart of an interactive embodiment for implementing a retouching mode in a batch mode.
FIG. 2E is a flowchart of an interactive embodiment for implementing a retouching mode in a consumer-operated kiosk setting.

FIG. 2B shows an alternative embodiment of enhancing a portrait image according to the present invention that is more conducive for highly automated and efficient production at a commercial photographic establishment. This embodiment describes an automatic batch process for running a large number of images through the portrait enhancement system without the necessity of user intervention. At an acquisition step 282, an image is acquired from a script file (computer file) that contains the names and locations of images that have been selected to be enhanced. The script file can also contain additional instructions that can be used to control the batch process. For example, the script can contain not only the location and name of the image but it also can contain instructions on what to name and where to store the enhanced image and also whether to delete the original image after generating the enhanced image. A diverse instruction set enables a flexible batch process that can be easily utilized by various commercial photography labs to fit their specific workflow schemes (see below). At a face detection and location step 284, the faces in the image are automatically detected and the locations of the facial feature points on each face are automatically identified. In an enhancement selection step 286, the system characterizes the face and determines the appropriate ensemble of enhancement filters and default parameters for the enhancement filters. Optionally, at this stage the gender and age of the face can be determined automatically using gender and age classification algorithms (as described hereinbefore).

Alternatively, the age and gender of the faces in the image can be supplied to the system via metadata associated with the image, e.g., the age and gender can be supplied from a customer-supplied photofinishing envelope or by otherwise querying the user. The default filters and parameters can also be supplied as image dependent metadata or as an image independent setting before the process of enhancement is implemented. The metadata can be directly incorporated into the image file or it can be obtained from the script file. FIG. 2C shows an example of a script file use to control the automatic batch process according to the present invention.

The system then executes the ensemble of enhancement filters in an enhancement execution step 288 using the appropriately chosen parameters. If there is more than one face in the image, this fact is noted in the face query step 290 and the system iterates through steps 286, 288, and 290 until all faces in the image are enhanced. During this time, intermediate images may be created containing image information (i.e. masks, feature maps, feature points, etc.) produced in a particular step for use in that or a subsequent step. At a storage step 292 the enhanced image is stored. In addition to storing the enhanced image, an output script file (as described below), and the intermediate images (as described above) can also be stored. The process of enhancing the images is continued until all the input images have been enhanced (image query step 294). After all the images have been processed (ending step 296), the enhanced images may be applied to the utilization stages 255–270 shown in FIG. 2A. Optionally, after all the images have been processed (ending step 296), the enhanced images can then be brought into the user interactive system, such as described in FIGS. 2A, 2D and 2E, to be checked for the acceptability of the enhanced image and, if needed, modified before the utilization stage (steps 255–270 in FIG. 2A).

FIG. 2D shows an embodiment for checking the acceptability of enhanced portrait images generated by batch processing according to the present invention. Commercial photo labs have very tight time demands in order to handle the vast number of images that are processed through these labs. Thus the user interactive system has to efficiently and optimally integrate with the output of the batch system so that the batch processed images can be rapidly reviewed and if needed modified so as to meet the productivity demands of commercial labs. To facilitate this need, an output script file is generated from the batch process for each processed image. The script file contains information describing the operations performed on the image and where the original, enhanced, and intermediate images are stored and also additional instructions for the interactive system on what to do with the original, enhanced, and intermediate images upon the acceptance or rejection of the enhanced image. Alternatively, the data within the output script or the location of the output script can be stored inside the image file as metadata. At an acquisition step 2000, the original, enhanced, and intermediate images are acquired using the data contained within the output script files or from the metadata contained within the image. The location of the output script file or image can be acquired from a script file that contains the names and location of output script files or images that have been processed by the batch system. At a display step 2010, the original and enhanced images are displayed side by side on the display monitor 50. At an accept/reject decision step 2020, the user decides either to accept or reject the batch system-generated enhanced image, by, e.g., clicking on either the accept or reject buttons. If the enhanced image is rejected, the user enters into an interactive retouching mode step 2030 where the user iterates through steps 286, 288, and 290 (FIG. 2B) until all faces in the image are enhanced (to the users). If available, the intermediate images (i.e. masks, feature maps, feature points, etc.) can be used to enable the rapid modification of enhanced images that are deemed unacceptable. The use of the intermediate images alleviate the need to carryout time consuming calculations (recalculate them) when applying the enhancement filters. At an accept/reject decision step 2040, the user decides whether to accept or reject the newly enhanced image. At a cleanup step 2050, the system executes the instruction in the output script file dealing with the fate of the original, enhanced, and intermediate images. As soon as the current image is accepted/rejected the next image on the list along with its enhanced image are immediately displayed so as to enable the operator to make a rapid decision on the acceptability of the enhanced image. The process of checking batch process-enhanced images is continued until all the images have been checked (query step 2060).

To further improve the productivity of the batch/interactive system, the batch system can automatically flag enhanced images that may require user attention. These flags can be used by the system to limit the number of enhanced images that have to be checked using the interactive system. The flags can represent a probability of the acceptability of the enhanced image and/or a textual description of the state of the enhanced image. For example, if at face detection and location step 284, the system fails to find a face, the system can flag the image with 0.00 acceptability flag along with a "No Face Found" flag. In another example, the system can flag the image with an acceptability flag proportional to the amount of skin texture enhancing performed on the image. The more the skin texture is enhanced the lower the acceptability flag. In another example, if the system determines that the face has a beard, a "Facial Hair" flag can be set or if the person is wearing glasses, a "Glasses" flag is set. If desired, only images with acceptability probabilities lower than a specified threshold and/or images with specific textual flags will be acquired and opened at step 2000 and high probability images will be skipped. It should be clear to one of ordinary skill in this art that there exist many other alternative embodiments of batch/interactive systems useful in practicing the current invention for high volume commercial photo labs.

Figure 2E:
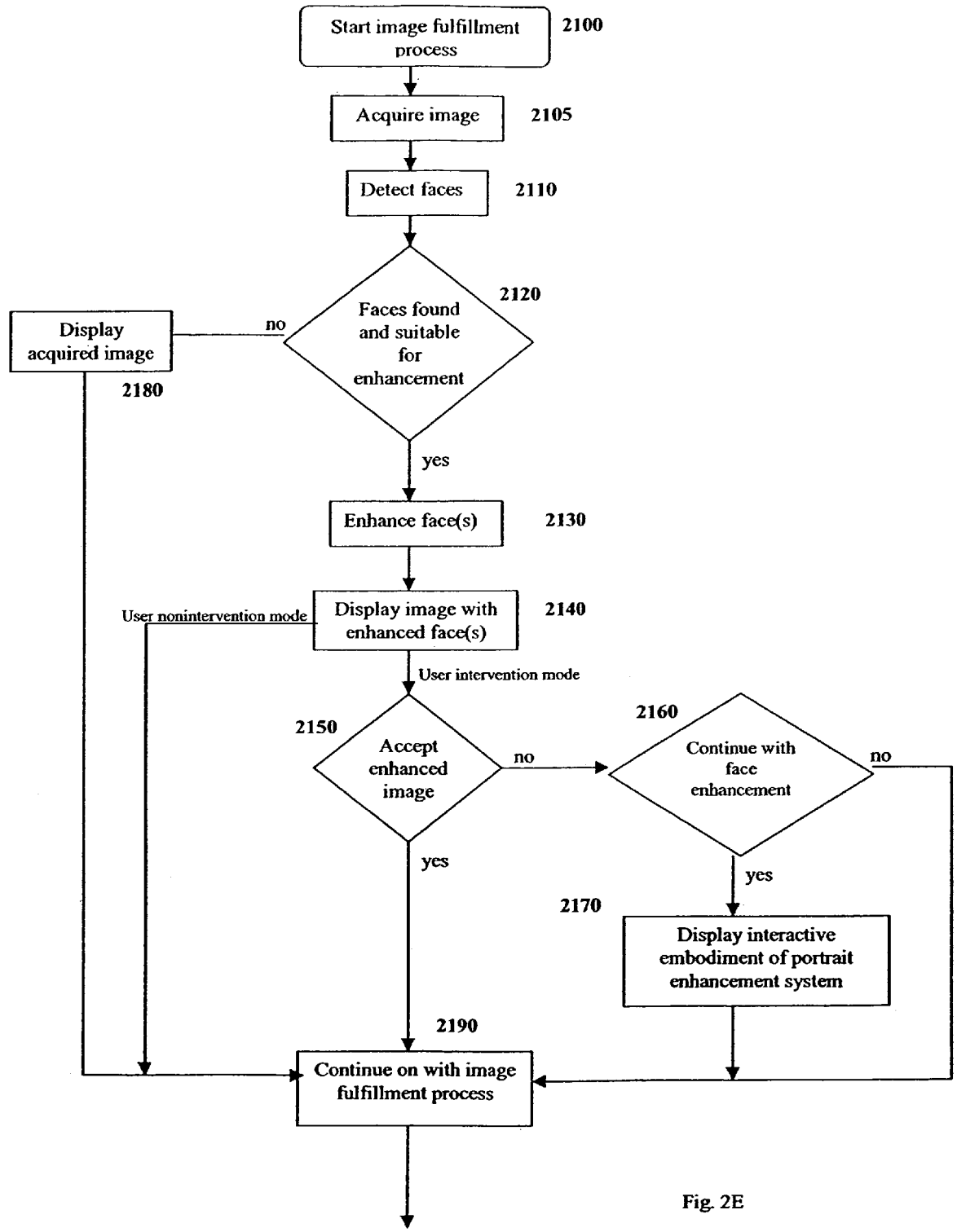

The portrait enhancement system embodiment described in FIG. 2a can be implemented on a consumer operated image fulfillment kiosk. The consumer if so desired can manually initiate the portrait enhancement system. FIG. 2e shows an alternative embodiment of enhancing a portrait image according to the present invention that is more conducive for consumer operated kiosks for generating prints from prints, negatives, digital files, etc. This embodiment describes a semi-automatic/automatic process for determining the suitability of an image to be enhanced and for applying the portrait enhancement to the image with or without user involvement. After the consumer initiates the fulfillment process in step 2100, a digital image is acquired by the system in acquisition step 2105. The image is acquired by scanning either a photo or a negative, or from a file contained on digital media, or from a file on a network if the system is connected to a server via a communication link. At face detection step 2110, the faces in the image are automatically detected before the acquired image is displayed to the consumer and if a face(s) is found the locations of the facial feature points on each face are automatically identified. At decision step 2120, if no faces are found in the image or if none of the detected faces are suitable for enhancement, the acquired image is displayed 2180 and the user continues on using the conventional image fulfillment kiosk processing 2190. There can be numerous criteria used to determine whether a face is deemed acceptable for enhancement. In a preferred embodiment, the size and sharpness of the face are used to measure whether the face is suitable for enhancement. In order to realize the benefits of enhancing the face, the face must be large enough and sufficiently in focus for the user to see the improvements. If a face(s) is detected that is deemed acceptable for enhancement the system then executes the appropriate enhancement filters in an execution step 2130 using the appropriately chosen parameters. After the system finishes executing the enhancement filters in the step 2130 the enhanced image is displayed 2140. In a user nonintervention mode the user continues on to use the image fulfillment kiosk processing 2190. In a user intervention mode, the user can decide if the enhanced image is acceptable. If at decision step 2150 the image is acceptable to the user, the user continues on using the image fulfillment kiosk processing 2190. Otherwise if the image is not acceptable, the user can choose at decision step 2160 either to bypass the enhancement stage and continue on using the kiosk processing 2190 or have the interactive version of the portrait system launched. At this point the GUI of the interactive portrait system (FIG. 1*b*) is displayed 2170 and the consumer can then use the interactive version to enhance the image until an acceptable result is obtained.

Figure 3:
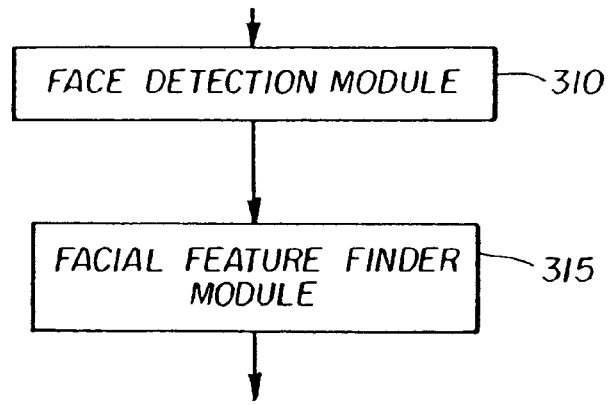
FIG. 3 is a flowchart of the facial detection and facial point location steps shown in FIGS. 2A and 2B.

FIG. 3 is a flowchart for the facial detection and point location step 210 of FIGS. 2A and 2B, showing the process of locating the salient facial feature points on the faces present in the image according to the present invention. A face detection module 310 is applied to the digital image to mark the locations and rough sizes of all human faces present in the image, and a facial feature detector 315 locates the salient facial feature points on the detected faces. The face detection step can be performed manually by the user or automatically using one of the numerous face detection methodologies that have been recorded in the academic literature. A preferred automatic face detection method for this application consists of methods described in Henry Schneiderman, *A Statistical Model for 3D Object Detection Applied to Faces and Cars*, Ph.D. Thesis, Robotics Institute, Camegie Mellon University, May 2000, which is incorporated herein by reference. Alternatively, if a manual approach is used to detect faces a preferred method is for the user to click on both eyes of one or more of the faces present in the image. The spatial separation of the eyes can be used to estimate the size of the face.

Following detection of one or more faces, the image coordinates and estimated size of each face are in turn provided to the facial feature detector 315, which has the task of locating the salient facial feature points on the detected faces. In the preferred embodiment, an active shape model is used as the facial feature detector. The active shape model is described in A. Lanitis, C. J. Taylor, and T. F. Cootes, "Automatic interpretation and coding of face images using flexible models," *IEEE Trans. on PAMI*, Vol. 19, No. 7, pp 743–756, 1997, which is incorporated herein by reference. The detected feature points are used to identify, outline, and segment different regions of the face, such as the facial skin region, eyes, nose, mouth, eyebrows, hair, facial hair, etc., and a neck region. The detected regions are identified by the corresponding binary masks. The binary masks of the regions are then spatially feathered to generate alpha masks. The alpha masks are used in step 235 and 288 to blend the results of the enhancement filter (e.g. texture enhancement filter) with the original image. Feathering binary masks and applying the resulting alpha masks in blending operation ensure smooth transition between regions that have and have not been enhanced. To generate alpha masks the binary masks are feathered by blurring the binary masks with a blurring function where the blur radius is chosen based upon the size of the face. The binary masks are used to determine where to spatially apply the enhancement filters as shown in FIG. 2A and FIG. 2B.

Figure 4:
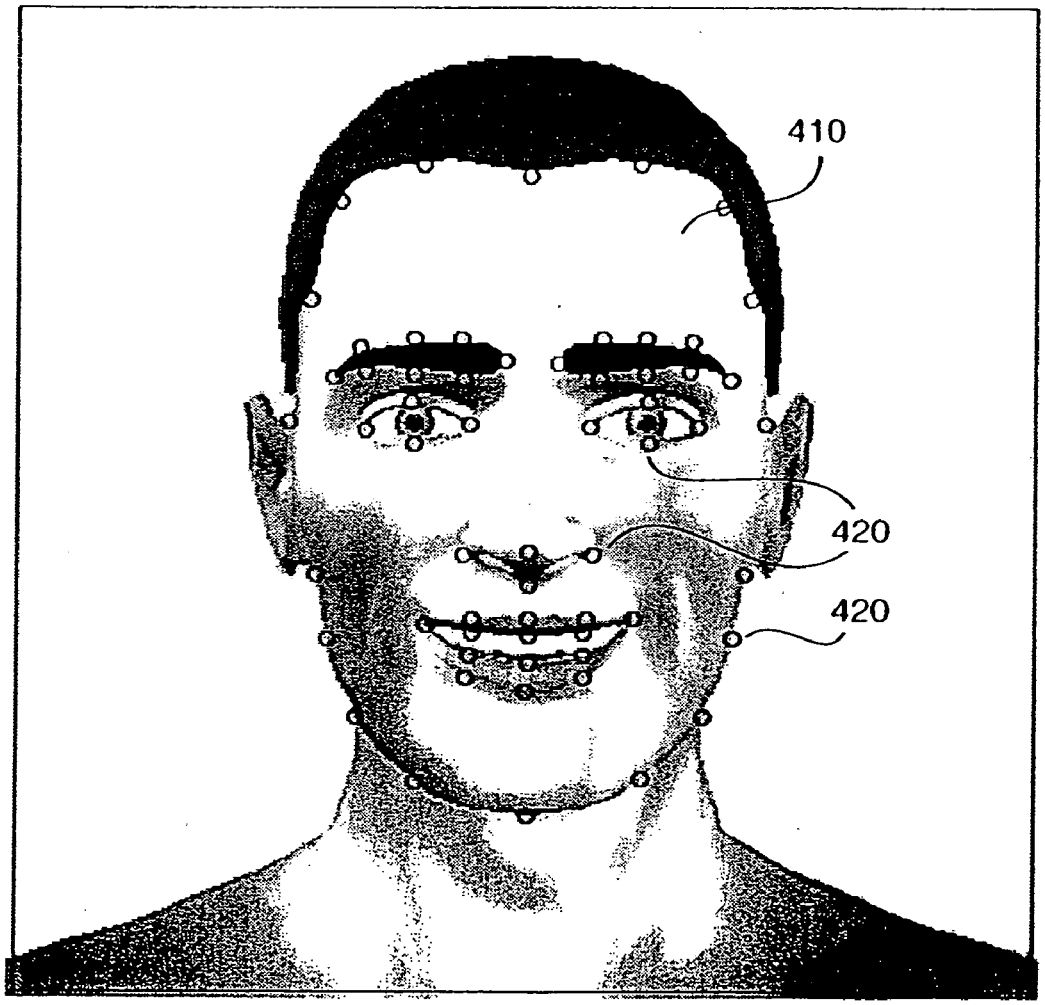
FIG. 4 is a pictorial example showing the location of salient feature points on a detected face.

Referring to FIG. 4, there is shown an visual example of the location of salient feature points 420 on a detected face 410. Typically these facial feature points are located either manually or automatically using image processing techniques.

Figure 5A:
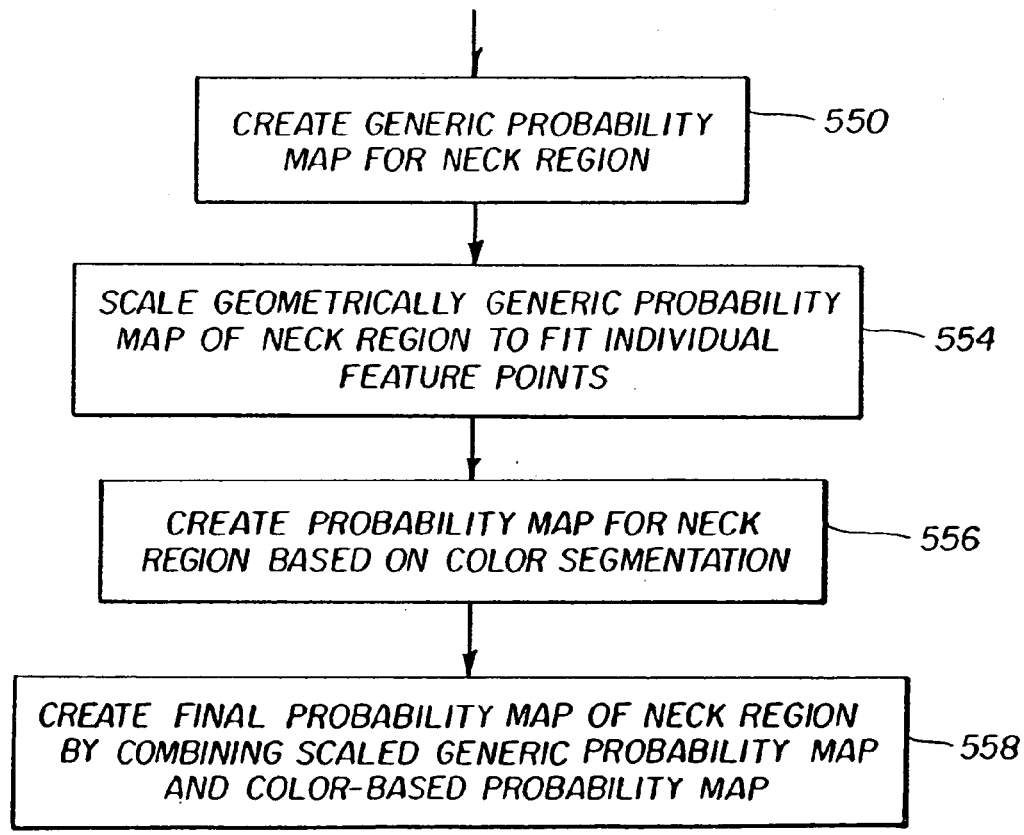
FIG. 5A is a flowchart of a method for determining a neck region.

In many images it is critical to apply the skin enhancement filters not only to the face region but also to the neck region. In a presently preferred embodiment, the neck region is determined by combining a modified generic neck shape model with a skin color classifier. The flow chart for the method of determining neck region is shown in FIG. 5A. In a generic mapping step 550, a generic probability map for a neck region is created. A generic neck probability map is based upon a priori knowledge of the shape of the neck. In the preferred embodiment, a generic probability map is created by averaging a sample population of normalized images that represent an anticipated population of images to be enhanced (e.g. portrait type images). The sample images are normalized by scaling each image to the same predefined location of the eyes. In each sample image, a neck region is outlined manually. The final neck probability for each pixel is an average sum of a scoring function equal to 1 if a given pixel is a part of neck region and 0 otherwise for all sample images. A generic neck probability map can be created using heuristic approximation. If a gender of a person in the image is known, a different probability map is used for men and women in the preferred embodiment. Usually, a skin region is more visible in portraits of women than of men. In a scaling step 554, a generic neck probability map is scaled to fit individual feature points of the chin line and the face outline.

In a skin color classification step 556, a neck probability map is created based on color segmentation. A supervised pixel-based color classifier is employed to mark all pixels that are within a specified distance of skin color. The pixel-based color classifier, which is a conditional probability function of pixel color C belonging to skin, is modeled as a Gaussian, $$p(C \mid \text{skin}) = \frac{1}{2\pi |\Sigma_{skin}|^{1/2}} \exp\left[-\frac{1}{2}(C - \mu_{skin})^T \Sigma_{skin}^{-1} (C - \mu_{skin})\right] \quad \text{(EQ. 1)}$$

where mean vector $\mu$ and the covariance matrix $\Sigma$ are estimated from the defined skin region. The vector C corresponds to the pixel's red (R), green (G), and blue (B) signal. The above approach is also applicable when C is represented in other color spaces, e.g., CIELAB, YUV, HSV, etc. A subset of the facial skin region is used to determine a conditional skin probability distribution. In a presently preferred embodiment the skin region above the eyes and skin regions where facial hair is detected are excluded from use in estimating the mean vector μ and the covariance matrix Σ in equation EQ. 1. The neck probability is defined according to equation EQ. 1 for all pixels outside the face region and below the chin line, and is equal to 0 otherwise.

In a final map generation step 558, the final probability map is created by combining the scaled generic neck probability map and the skin color based probability map. In the preferred embodiment, two probability maps are arithmetically multiplied. The resulting neck probability map is used as an alpha channel to determine how to blend the results of the enhancement filters with the original image. The binary neck region mask is created by thresholding the final neck probability map. If the probability is greater than 0 for a given pixel, the corresponding mask value is equal to 1 thereby indicating the neck region, otherwise the mask value is equal to 0 thereby indicating a non-neck region. The binary neck region mask is used to determine where to apply the enhancement filters.

Figure 5B:
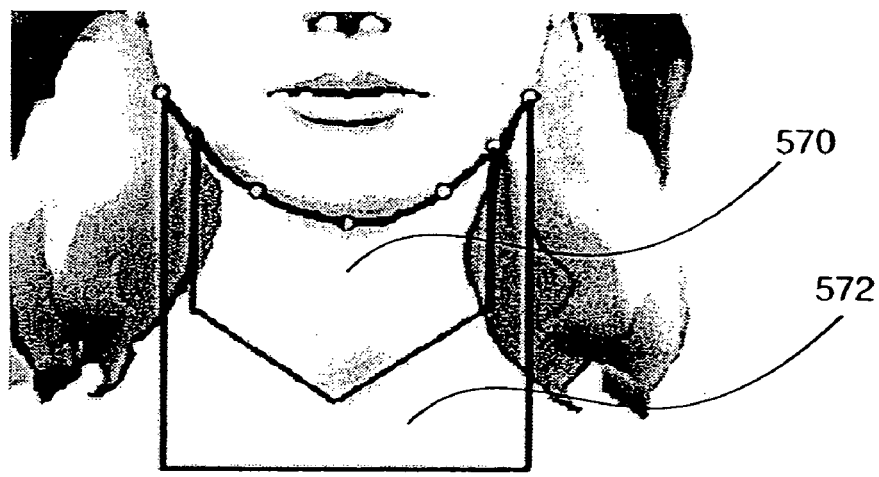
FIGS. 5B–5D are pictorial examples that visually illustrate the process of creating the final neck probability map.
Figure 5C:
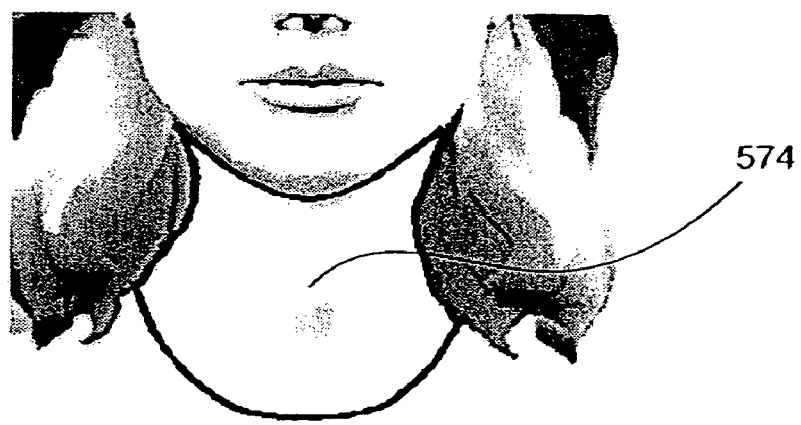
Figure 5D:
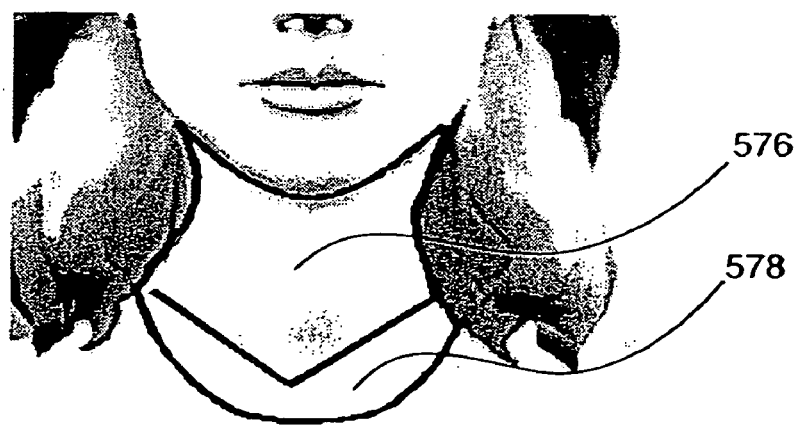

FIG. 5B–5D demonstrate visually the process of creating the final neck probability map. Referring to FIG. 5B, a scaled generic neck probability map is shown. A generic probability map is scaled to match the individual feature points outlining the face. A generic neck probability map is based on a priori knowledge of neck location relative to the outline of the face as described in the previous section. The generic neck probability shown in FIG. 5B is one possible example based on heuristic rules rather than statistical analysis recommended in the previous section. It serves the purpose of demonstrating qualitative characteristics of the process. A central region 570 within the generic mask has high values (e.g. greater than 0.5 and less than or equal to 1) corresponding to the high probability of the neck region. A border region 572 has lower values (e.g. greater than 0 less than 0.5) corresponding to the lower probability of the neck region. The probability of the neck region tapers off to a value of 0 outside the region 572. In general, the probability decreases in a continuous manner from the center of the region 570 to the edges of the region 572 in a horizontal direction and from top to bottom in a vertical direction. The central region of the mask that is right below the chin line has the largest probability associated with it.

An outline 574 of the neck probability map determined by a skin color classifier is shown in FIG. 5C. The skin color based probability is calculated according to the equation EQ. 1 as described in the previous section. The probability values outside the outlined region 574 are equal to 0. The probability values within the region 574 are greater than 0, as defined by equation EQ. 1. The two neck probability maps: the scaled generic neck probability map and the neck probability map based on skin color classification are combined by arithmetic multiplication of the two. The outline of the resulting final neck probability map is shown in FIG. 5D. The central region 576 corresponds to the high probability region 570 cropped by the skin color probability region 574. The region 578 corresponds to the low probability region 572 cropped by the skin color probability region 574.

Once the facial feature points and neck region have been located, an ensemble (i.e., two or more) of appearance enhancement filters can be applied to the face and neck regions in the image. Referring to FIG. 6, several different enhancement filters are shown. In the preferred embodiment, the following enhancement filters are implemented: a skin texture enhancement filter 610, a skin tone enhancement filter 620, a teeth enhancement filter 630, an eye enhancement filter 640, and a facial feature shape enhancement filter 650. All these filters are described in detail in the following sections of the specification. The enhancement filters can be applied in any order. In one embodiment, the user can select any of the enhancement filters in any order he/she wants to apply them to the faces and neck regions in the image. However, in the preferred embodiment, the system sets a default order of applying enhancement filters together with the appropriate parameters.

If the user elects to run default settings, then all enhancement filters are applied in the default order with the default parameters and the enhanced image is displayed on the monitor. The default order of enhancement filters is as follows: the skin texture enhancement filter, the skin tone enhancement filter, the teeth and eye whitening filter (in either order), and the facial feature shape enhancement filter. The enhancement filters are described in the next sections in the same order as the default order of applying filters to the original image.

Some of the default parameters may be dependent on the class of images, where the class is based on a category of subject matter. For example, a set of default parameters may be optimized for categories such as school portrait images, family portrait images, baby pictures, and so on. In one of the embodiments, when running the system in a batch mode, the operator may either specify, in the control script, file parameters for each filter or just specify the class of images. When a class of images is specified then the preferred set of parameters for a given class is used. In a similar manner, for an interactive software embodiment of the present invention a user may select a class of images from the preference menu and the default settings will be set up automatically for the enhancement filters.

Figure 6B:
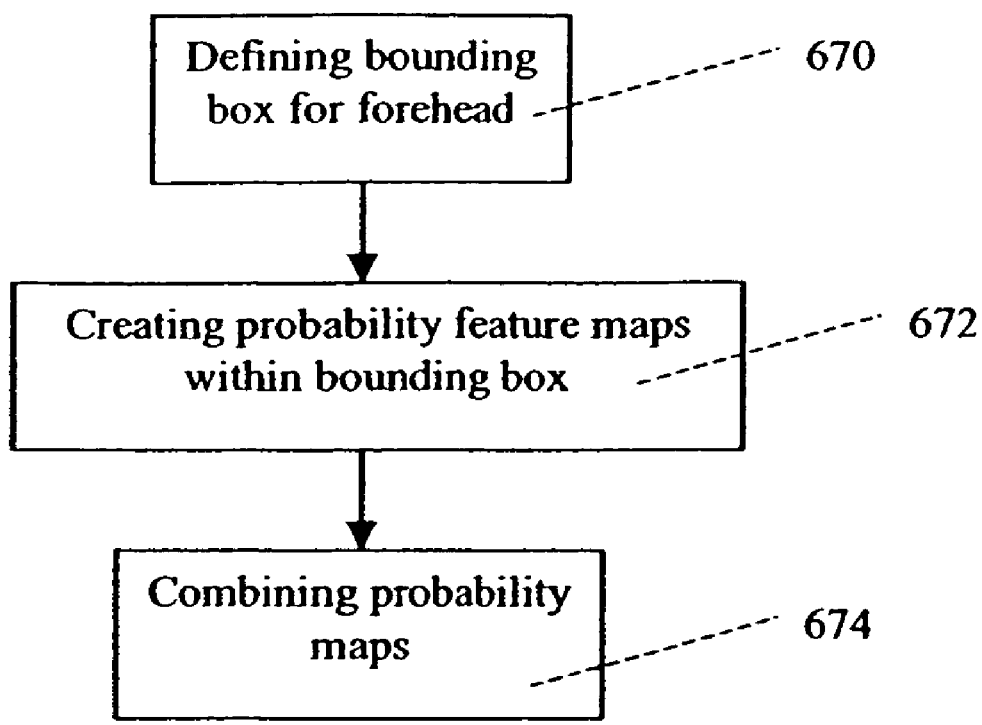
FIG. 6B is a flowchart of a method for creating a hair mask for a forehead area.

When enhancement filters that change skin appearance (e.g. skin texture enhancement filter) are applied, it is usually important to mask off hair and facial hair. Otherwise, artifacts such as lack of hair texture may be very noticeable in the resulting image. The feature points determined by the feature finder algorithm usually do not precisely outline precisely highly variable features such as the hair line, which is irregular and widely varies from face to face. In the preferred embodiment, a refinement step is added to mask off hair overlapping with the forehead skin region. Referring to FIG. 6B, a flowchart for refining a hairline mask is shown. In step 670, the forehead bounding region is defined. The bounding region is determined based on detected feature points (eyes location) and maximum possible size of the forehead known from a priori knowledge of human anatomy. In step 672, different feature probability maps are created within the forehead bounding region. The feature probability maps include texture information and color information derived from the original image. In the preferred embodiment, directional edge maps are created for horizontal, vertical and diagonal directions. The directional edge detectors used for creating texture maps are described in detail in the following section on texture enhancement. In one preferred embodiment, the texture probability map is created in the following steps. First, the vertical edge gradient is calculated as described in the texture enhancement section. The vertical edge detector kernel size depends on the eye separation distance. In the second step, a connected component map is created for all the vertical edges with a gradient magnitude greater than a specified threshold. In the next step the normalized connected component density is calculated according to equations Eqs. 2 and 3.

$$d(x, y) = \sum_{m=x-k}^{x+k} \sum_{n=y-k}^{y+k} w_{m,n} C(m, n) \quad \text{(EQ. 2)}$$

$$\bar{d}(x, y) = \frac{d(x, y)}{d_{\max}} \quad \text{(EQ. 3)}$$

where $d(x,y)$ is the connected component density at pixel $(x,y)$ calculated within a region $(2k+1)–(2k+1)$ centered around pixel $(x,y)$, $w_{m,n}$ is a weighting factor based on the distance to pixel $(x,y)$, $C(m,n)$ is the size of the connected component that pixel $(m,n)$ belongs to, $d_{max}$ is the maximum value of $d(x,y)$ in the region of interest, $\bar{d}(x,y)$ is the normalized connected component density at pixel $(x,y)$.

Next, the normalized connected component density values are thresholded. If less than a specified threshold (e.g. 0.3) the density value is set to 0 otherwise it is preserved. The thresholded normalized connected component density map can be used as a hair texture probability map. The edge detector kernel size depends on the eye separation distance. The skin color probability map may be created using the same approach as described for the neck color probability map in the previous section. In step 674, probability maps are combined by normalized weighted sum of probabilities. The final probability map is combined with the original face alpha channel as the new alpha channel map used for blending. The same technique can be used for facial hair. Instead of defining the bounding box for the forehead in step 670, the region of interest is defined for beard and/or moustache based on facial feature points determined by the feature finder algorithm. Then the feature probability maps are created for the particular regions of interest. If the gender is known beforehand, the facial hair masking can be enabled for men and disabled for women. This can increase the overall speed of the system and eliminate artifacts that may be created due to falsely detected facial hair.

It is important in the embodiment of the present invention that the enhancements applied to the face do not create or increase asymmetrical look of the face. For example, some symmetric characteristic skin features like laugh lines or lines under eyes if removed should be removed on both sides of the face or if enhanced should be enhanced in a proportional and symmetrical way. When relevant, the symmetry issue is addressed specifically for each enhancement filter in the following sections.

Texture Enhancing Filter.

The task of the skin texture enhancing filter is to smooth the local texture of the skin, remove blemishes, dark spots, etc. and to either remove or lessen the extent and deepness of wrinkles. Referring to FIG. 7A, there is shown a flowchart for a skin texture enhancing filter according to the present invention. In a skin feature generation step 710, the skin features that are within the skin region delineated by the facial feature points are detected. Then the detected skin features are modified in a feature modification step 720. Skin feature map contains features that we wish to modify, such as blemishes, dark spots, wrinkles, etc.

In the prior art, color analysis is used to locate specific skin defects. Also in the prior art, the detection of skin defects is performed by analyzing the histogram of the color signals associated with the pixels contained within a finite 2-dimensional window that is slid over the skin region. A region is considered to contain a skin defect if its associated histogram is found to be bimodal. Since these techniques use color information as part of their primary detection means, it requires that the imaging system be color calibrated and/or the image to be analyzed be correctly color balanced. The efficacy of using color information is enhanced when controlled lighting and/or colored filters are used to capture the images. In addition, accurate color reproduction is needed if the detected defects are going to be further classified as blemishes, brown spots, etc based on the color of the defect.

In photographs, the skin imperfections such as wrinkles, blemishes, etc manifest themselves as (are really just) highlights and shadows in places where they should not be. The skin imperfections thus correspond to local intensity maxima and minima. The highlights correspond to peaks and the shadows correspond to valleys in the luminance image. In a departure from the prior art, and according to a preferred embodiment of the current invention, skin imperfections are detected by applying peak and valley detectors to the luminance image formed from the component RGB signals. Valley/peak detectors are second difference operators. The luminance is defined as a weighted linear combination of the red R, green G, and blue B signals, as follows, $$L = k1R + k2G + k3B \quad \text{(EQ. 4)}$$

where k values represent the weights. A presently preferred choice of weights for generating the luminance image is $k1=k2=k3=0.333$. Examples of valley/peak operators can be found in D. E. Pearson and J. A. Robinson, "visual Communication at Very Low Data Rates," *Proceedings of the IEEE*, Vol. 73, No. 4, April 1985.

A presently preferred peak/valley operator is a series of four directional operators of the type employed by Pearson et al. A vertical operator V, which is applied to the middle pixel m in the 5×5 neighborhood of pixels shown in FIG. 7B, where the pixel locations are designated a through y, is defined by equation EQ. 5, as follows, $$V = f + k + p + j + o + t - 2(h + m + r) \quad \text{(EQ. 5)}$$

This operator is applied at each pixel location in the delineated skin region. Similarly, a horizontal operator H of the form shown in equation EQ. 6 and a pair of right and left diagonal operators DL and DR as shown in equations EQ. 7 and EQ. 8. Respectively, are applied at each pixel location in the delineated skin region, as follows, $$H = b + c + d + v + w + x - 2(l + m + n) \quad \text{(EQ. 6)}$$

$$DR = c + g + k + o + s + w - 2(i + m + q) \quad \text{(EQ. 7)}$$

$$DL = c + i + o + k + q + w - 2(g + m + s) \quad \text{(EQ. 8)}$$

These operators not only detect valleys/peaks, but they also have a secondary response to the feet/shoulder of edges. Thus they are referred to as valedge/peakedge detectors. Valedge features correspond to positive values of the operator's output whereas peakedge features correspond to negative values. A valley/peak detector that is sensitive only to valleys/peaks is obtained by applying logical conditions to operators. For vertical valleys the logical valley detector correspondence is given by:

$$\text{if } (f+k+p) > (h+m+r) \text{ and } (j+o+t) > (h+m+r) \text{ then } V = (f+ k+p+j+o+t) - 2(h+m+r) \text{ else } V = 0 \quad \text{(EQ. 9)}$$

For vertical peaks the logical peak detector correspondence is given by:

$$\text{if } (f+k+p) < (h+m+r) \text{ and } (j+o+t) < (h+m+r) \text{ then } V = (f+ k+p+j+o+t) - 2(h+m+r) \text{ else } V = 0 \quad \text{(EQ. 10)}$$

Logical detectors for a horizontal and diagonal valleys/peaks have similar form.

Both valley/peak and valedge/peakedge operators are effective for generating the skin feature map according to the present invention. From this point on we use the term valley/peak operators to refer both to valley/peak and valedge/peakedge operators.

Prior to applying the oriented valley/peak filters to the image, the effects of noise in the image are suppressed by applying a noise reduction filter. Appropriate noise filters are low pass filters, median filters, and other linear and non-linear filters commonly employed to reduce noise in digital images.

The oriented valley/peak images generated by the operators are thresholded so as to retain only (strong) relevant skin features. For valley feature maps, pixels with values less than a specified threshold $T_v$ are set to zero. For peak feature maps, pixels with values greater than a specified threshold $T_p$ are set to zero. The threshold can be either a fixed global threshold or an adaptive threshold. A presently preferred threshold method is to use an adaptive threshold whose value is given by equation EQ. 11.

$$T=\beta L_{avg} \qquad (EQ.\ 11)$$

where $\beta$ is a constant and $L_{avg}$ is the local average luminance about the pixel. Different values of $\beta$ can be used for the vertical, horizontal, and diagonal components. The local average luminance $L_{avg}$ may be the value of the pixel itself or the average luminance of a neighborhood of pixels, for example a 3×3 neighborhood of pixels.

A presently preferred step is to generate a combined skin feature map E by combining the individual oriented feature maps.

$$F=\max\{H, V, DR, DL\} \qquad (EQ.\ 12)$$

Additionally, each pixel in F can be labeled according to which oriented filter it originated from. The oriented label data and/or the individual oriented skin feature maps can be useful in removing features such as wrinkles where features of a particular orientation are preferentially removed.

The task of the skin texture enhancing filter is to smooth the local texture of the skin. The spatial size of the skin texture that the skin texture enhancing filter smoothes is a function of the size of the face. Thus in order to detect the appropriate skin features the spatial size of the valley/peak filters is adaptively determined based upon the size of the face. In addition, the type of valley/peak filter (directional, isotropic, etc.) can also be adaptively selected based upon the size of the face. Specifically, the separation between the eyes is used to determine the size and type of valley/peak filter. One generic representation for the vertical valley/peak operator is $$V(x, y) = \frac{1}{2h}\sum_{i=-h}^{h} I(x-w, y+i) - 2I(x, y+i) + I(x+w, y+i) \qquad (EQ.\ 13)$$

where w and h are chosen as a function of the face size. Generic valley/peak detectors for a horizontal and diagonal valleys/peaks have a similar form.

A presently preferred isotropic valley/peak detector is given by subtracting the blurred luminance image $I_b$ from the luminance image I $$F(x,y)=I(x,y)-I_b(x,y) \qquad (EQ.\ 14)$$

The blurred luminance image can be generated by applying a blur filter such as a Gaussian or a box filter to the luminance image. The output of the valley/peak detector is thresholded as described above to generate peak and valley feature maps. The radius of the blur filter is chosen as a function of the face size (which is an example of a default parameter) and the size of the skin feature that one wishes to detect.

The feature maps are further refined by grouping pixels that are connected to each other via connected component labeling. Connected component labeling scans an image and groups its pixels into components based on pixel connectivity, i.e., all pixels in a connected component are in some way connected with each other Once all groups have been determined, each pixel is labeled according to the component it was assigned to. Each connected component corresponds to a skin feature. Each skin feature is characterized and classified by its feature-based characteristics such as size, shape, and location in the skin region. The size corresponds to the number of pixels in the component (which is an example of a default parameter). Shape information describes specific characteristics regarding the geometry of a skin feature. Examples of shape information are spatial moments, bounding boxes, orientation, principal axes, etc. Additional information on shape analysis can be found in William S. Pratt, *Digital Image Processing*, $2^{nd}$ edition, John Wiley & Sons, 1991. In addition, the features delineated in the skin feature map can be further classified using the color information associated with the pixels that have been identified as skin features. Shape and color information is useful in delineating higher order features, such as wrinkles, blemishes, beauty marks, moles, shadows, highlights, and so on. Once the skin feature maps are generated they are used to select the skin features that are going to be modified in step 720.

Figure 8:
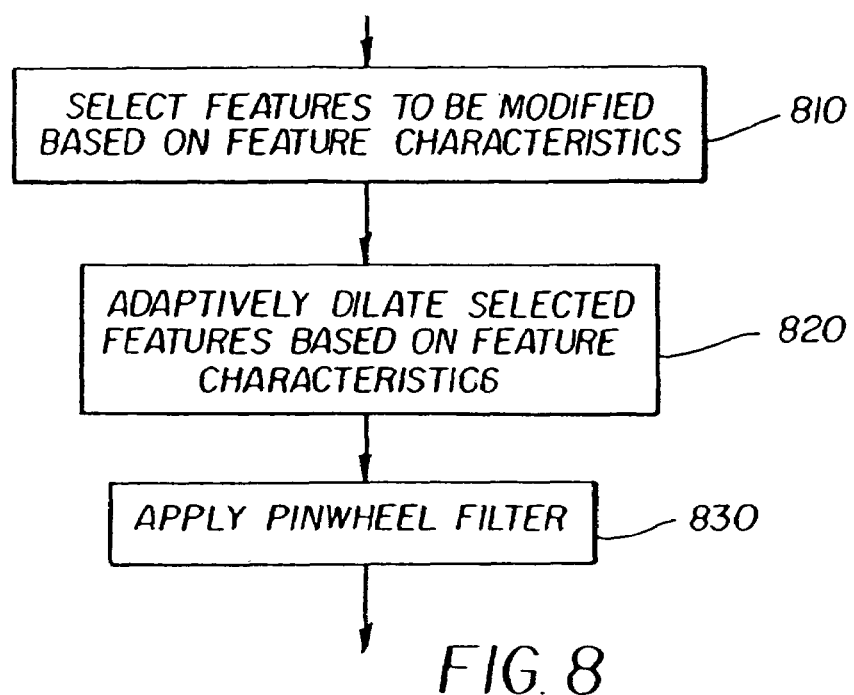
FIG. 8 is a flow chart showing a preferred embodiment of selecting and modifying skin features according to the invention.

Referring to FIG. 8, there is shown a flow chart illustrating a preferred embodiment of selecting and modifying skin features according to the present invention. In a feature selection step 810, features to be modified are selected based on their characteristics. As mentioned above, the feature characteristics correspond to the size, shape, and color and are selected based upon the location of these features in the skin region. The selection of skin features has to take into account symmetry considerations as well. Some skin features are symmetrical with regards to right and left side of the face. Selecting and modifying some distinctive skin feature only on one side of the face may create asymmetry that can be perceived as an artifact. One example may be skin creases under the eyes or the prominent nasolabial creases (laugh lines) that are strongly visible when one is smiling. In the preferred embodiment, these symmetric features are identified automatically based on their characteristics (e.g. location, shape, color, etc). When one of these symmetric features is selected for enhancement, e.g., based on its size or/and other characteristic, than the corresponding symmetric feature on the other side of the face is selected automatically as well regardless of its characteristics to ensure symmetry of the resulting enhancement.

Which symmetric skin features are always excluded from the selection and enhancement and which ones are eligible for selection depends on the desired look of enhancement. This may be determined based on the age or gender. In another embodiment, some symmetric skin feature may require a unique type of enhancement.

In a dilation step 820, the selected skin features are then (adaptively) dilated and then modified in a filtering step 830. The effect of dilation on a skin feature is to enlarge the size of the skin feature. The amount of dilation can be either a fixed amount for all selected skin features or an adaptive amount based upon the characteristics of the skin feature. In a presently preferred embodiment, the skin features are adaptively dilated based upon their size and the size of the face (which is an example of a default parameter). Larger skin features are dilated more than smaller skin features. The process of dilation can be carried out using standard morphological operators.

Optimal skin enhancement is obtained by sequentially modifying skin features by cycling through the steps of 810, 820, and 830 while changing the type of skin feature to be modified, albeit all the desired skin features can be selected and modified in one cycle through the steps 810, 820, and 830. In a presently preferred embodiment the valley skin features are first selected and modified in steps 810–830, and then the residual peak skin features are selected and modified in the second iteration through steps 810–830. In order to preserve the skin texture, only skin features whose sizes are between a specified minimum and a maximum size are modified. Alternatively, in order to preserve the skin texture, only skin features whose sizes are larger than a specified minimum size are modified. In addition, the minimum and maximum size of the skin features to be modified directly scale with the size of the face.

Figure 9:
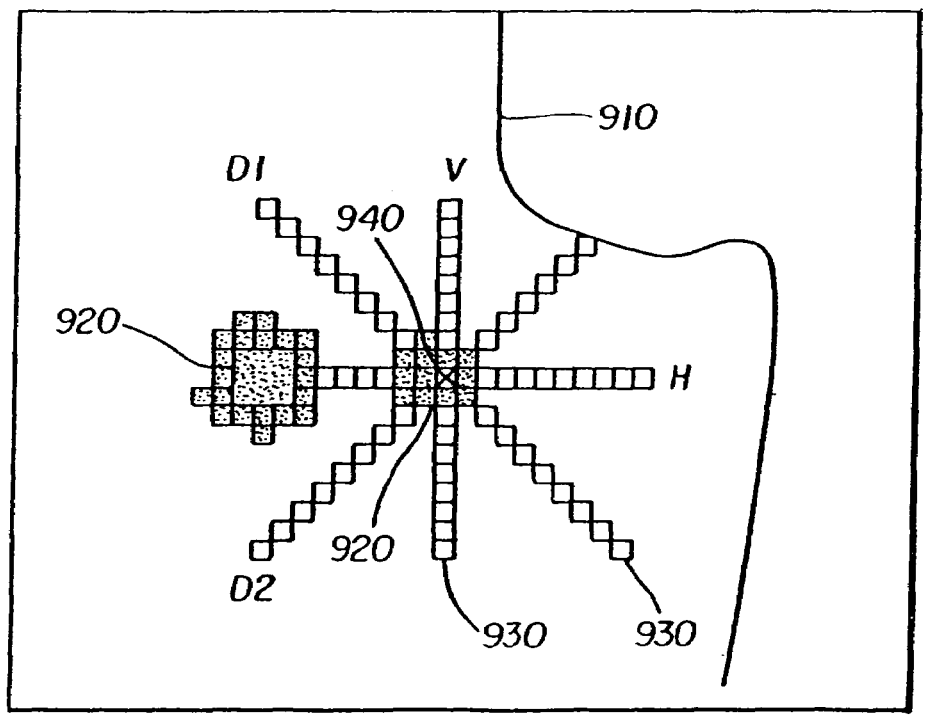
FIG. 9 is a pictorial example of a pinwheel filter illustrating line segments defined around a defect pixel.

In step 830, a pinwheel filter is applied to each pixel of dilated features. Pixels of dilated features are referred to as feature pixels. All other remaining pixels are referred to as non-feature pixels. In the embodiment of the present invention, feature pixels are defined by a binary mask, where a value of 0 corresponds to feature pixels and a value of 1 corresponds to non-feature pixels. The pinwheel filter interpolates new values of a given feature pixel by using neighboring non-feature pixels aligned in line segments centered at the feature pixel- The pinwheel filter is described in detail in commonly-assigned U.S. Pat. No. 6,104,839 "Method and Apparatus for Correcting Pixel Values in a Digital Image", which issued Aug. 15, 2000 in the names of David R. Cok et al, and which is incorporated herein by reference. A brief description of the pinwheel filter is included here for clarity and to specify some modifications to the original algorithm as described in the patent by Cok et al. Referring to FIG. 9, the SET of four line segments 930 is graphically demonstrated (vertical V, horizontal H, two diagonal line segments D1 and D2) for the selected feature pixel 940. The four line segments are spaced at 45° degree increments. The dilated features 920 are represented in gray (shaded) color. The line 910 represents a face boundary. Each line segment in the SET is composed of both feature and non-feature pixels on both sides of the pixel 940. The non-feature pixels and feature pixels in the line segment are pixels local to the selected feature pixel 940 in a given direction defined by the line segment. The method of creating the SET of line segments is described in detail later.

Figure 10A:
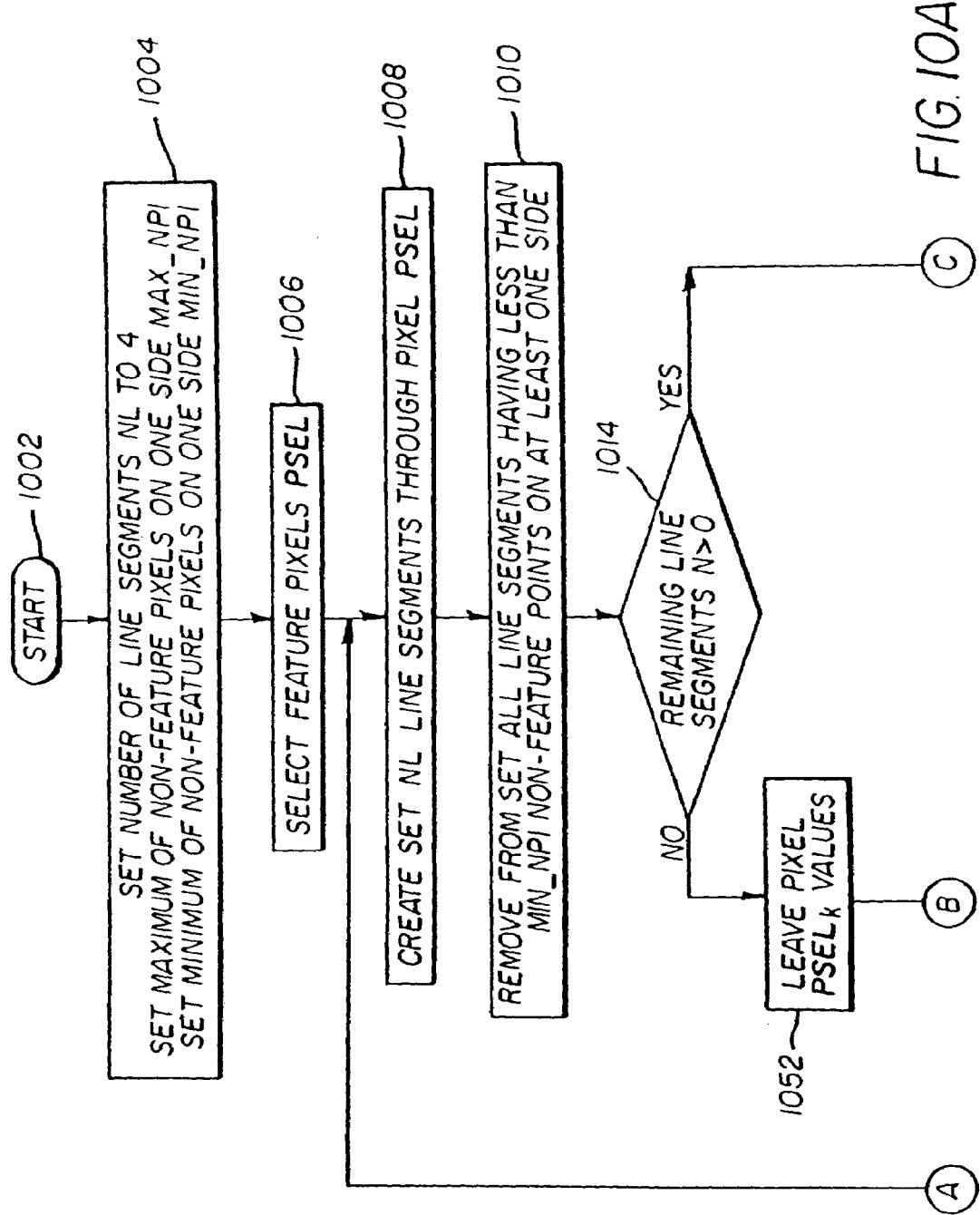
FIGS. 10A and 10B together represent a flow chart illustrating a process utilizing the pinwheel filter of FIG. 9 for estimating corrected values for a defect pixel.
Figure 10B:
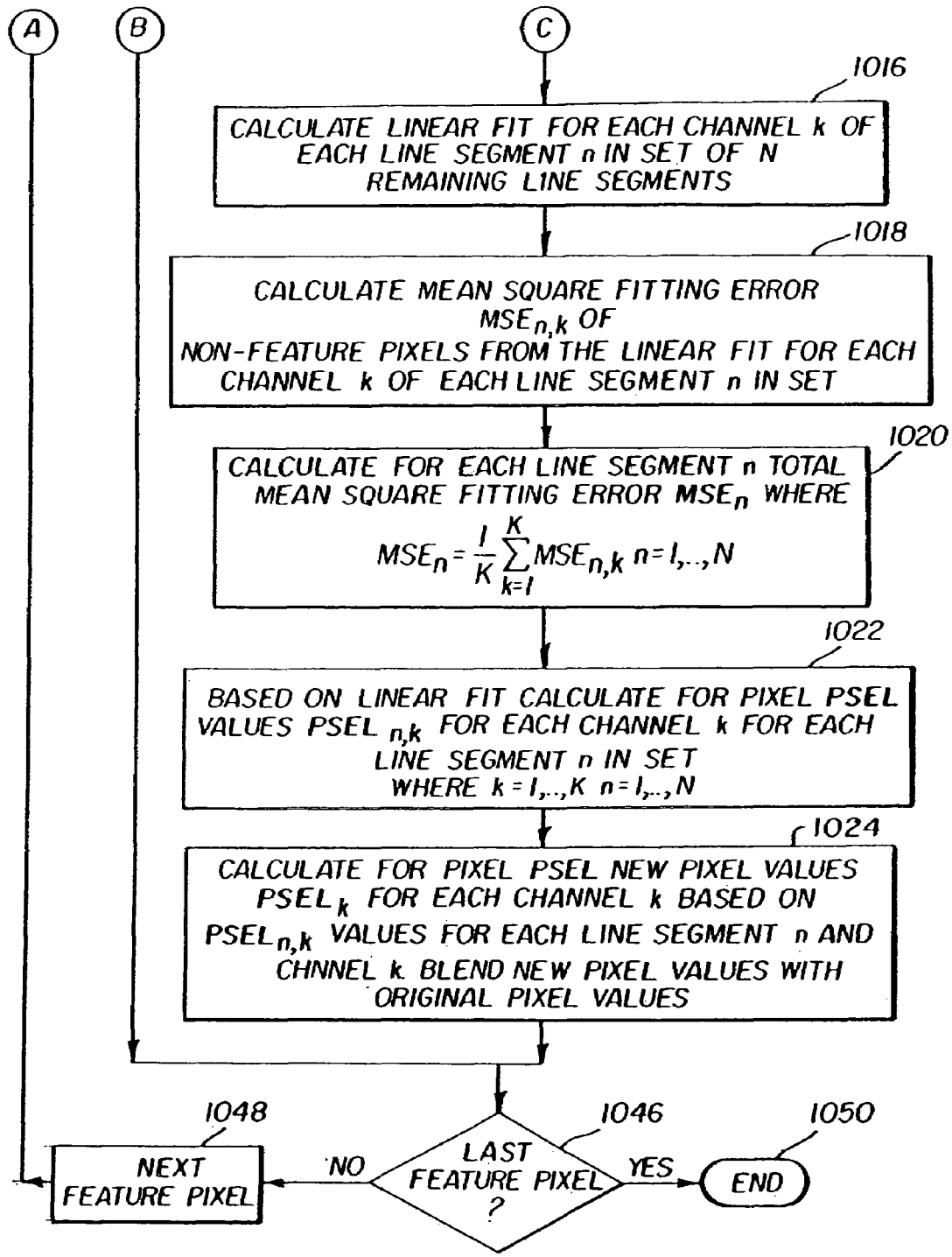

Referring to FIGS. 10A and 10B, the method for calculating new values for each feature pixel in the image by applying the pinwheel filter is shown. In step 1004, the number of line segments NL, the maximum number of pixels on one side of the line segment MAX_NP1 and the minimum number of pixels on one side of the line segment MIN_NP1 are set. These parameters will be explained in detail in reference to FIG. 12. The maximum number of pixels on one side of the line segment MAX_NP1 and the minimum number of pixels on one side of the line segment MIN_NP1 are set based on the size of the face (which is an example of a default parameter). The larger the size of the face, the larger the values of MAX_NP1 and MIN_NP1. The dependence of these two parameters upon the size of the face is unique to the present invention compared to the method described by Cok et al. In step 1006, the first feature pixel PSEL is selected. In step 1008, the SET of NL line segments is created through the pixel PSEL. In the preferred embodiment, the number of line segments NL in SET is equal to 4, corresponding to vertical, horizontal and two diagonal line segments.

Figure 12:
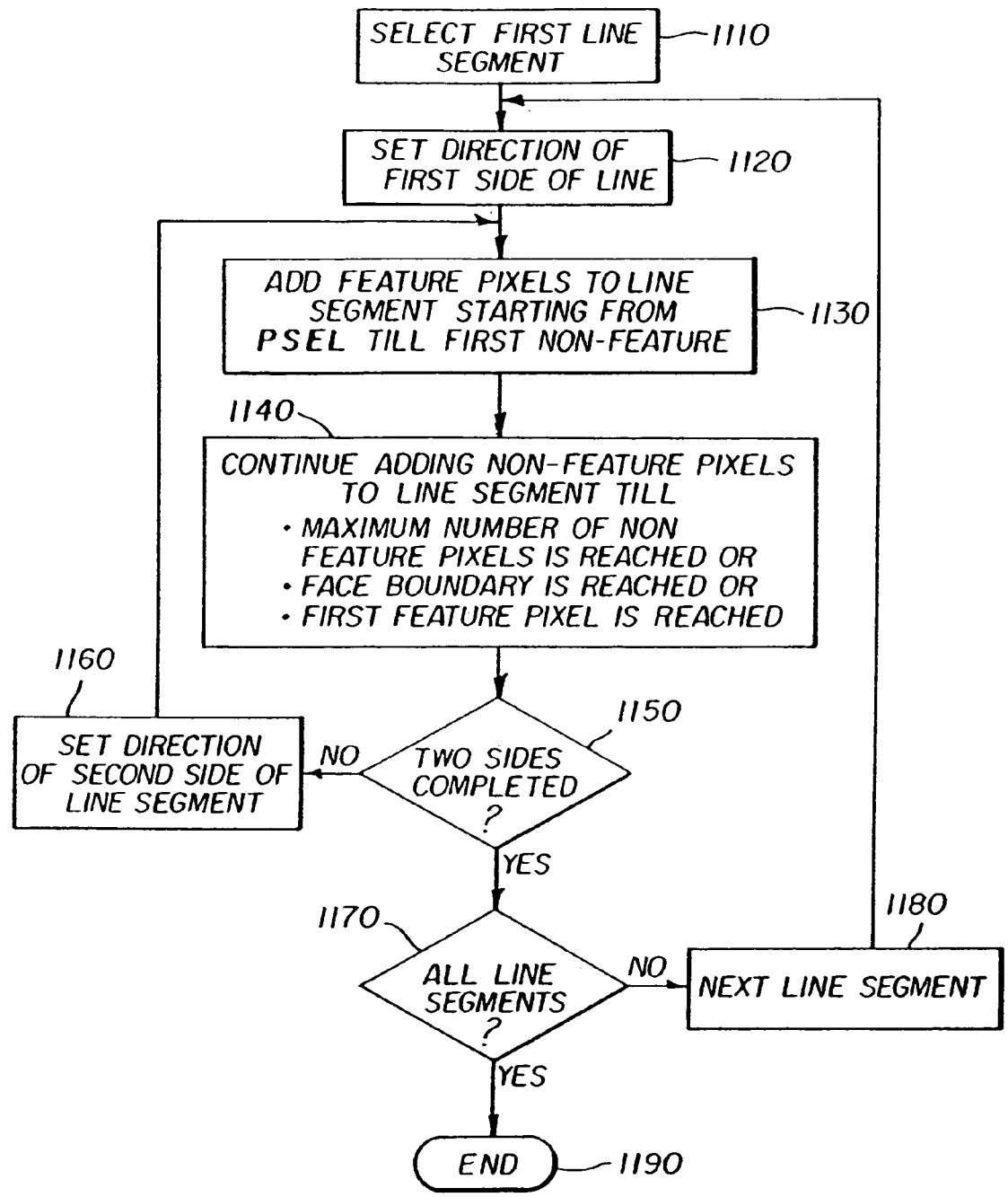
FIG. 12 is a flow chart illustrating a process for creating line segments through a feature pixel in the pinwheel filter shown in FIG. 9.

A method of creating line segments is shown in FIG. 12. In step 1110 of FIG. 12, the first segment is selected, e.g., the vertical line segment (V). In step 1120, the direction of one side of the line segment is selected. This is a direction in which pixels are being added to the line segment starting at pixel PSEL. For each segment, two directions are defined that correspond to two sides of the line segment centered at pixel PSEL. In step 1130, feature pixels are being added to the line segment until a first non-feature pixel is reached along a given direction. In step 1140, the first non-feature pixel is added to the line segment and the neighboring non-feature pixels in a given direction are being added to the line segment until one of the following conditions is met:

maximum number of non-feature points on one side MAX_NP1 is reached, face boundary or face feature boundary is reached, new feature pixel is reached.

The maximum number of non-feature points on one side of the line segment MAX_NP1 is set in step 1004 (FIG. 1A) based on the face size. The line segments must not cross the face boundary or boundaries of the regions excluded from the texture enhancement process (like eye regions, mouth regions, etc.). The above constraining condition for creating valid line segments is unique to the present invention compared to the method described by Cok et al. When adding pixels to one side of the line segment is completed, then the direction is set for the second side of the line segment in step 1160, and the process is repeated for the second side of line segment in steps 1130–1140. When two sides are completed (step 1150), then the next line segment from the SET is selected (step 1180) and the process is repeated in steps 1120–1160. When all NL line segments in SET are created (step 1170) the process is completed (step 1190).

Referring back to FIG. 10A, after creating the SET of NL line segments in step 1008 as described above, the line segments having less than MIN_NP1 of non-feature points on at least one side are removed from the SET (step 1010). If no remaining valid line segments are left in the SET (step 1014), then pixel values are not changed for the pixel PSEL (step 1052) and a new feature pixel PSEL is selected (step 1046 and 1048) and the process is repeated (starting with step 1008). If the number of remaining valid line segments N in SET is greater than 0 (step 1014), then for each remaining valid line segment a linear fit is calculated (step 1016) for the non-feature pixels in the valid line segment for each channel. In step 1018, mean square fitting error is calculated for each valid line segment for non-feature pixels for each channel based on the linear fit computed in the previous step 1016. In step 1020, total mean square fit error is calculated for each valid line segment as an average of mean square fitting errors for all channels for a given valid line segment according to the following equation.

$$MSE_n = \frac{1}{K}\sum_{k=1}^{K} MSE_{n,k} \quad \text{where } n = 1, \ldots, N \quad \text{(EQ. 15)}$$

where K is a number of channels in the image. For black and white images, K is equal to 1. For color images, K is usually equal to 3 (e.g. 3 channels corresponding to R,G,B channels).

In step 1022, values $PSEL_{n,k}$ are calculated for pixel PSEL for each valid line segment n for each channel k based on linear fit computed in step 1016. In step 1024, new pixel values $PSEL_k$ are calculated for each channel k. The final pixel values of the enhanced image are determined by blending new pixel values $PSEL_k$ for each channel k with the original pixel values according to alpha masks generated in the previous sections. The blending operation insures smooth transition between enhanced and not enhanced regions of the skin. The blending operation in step 1024 and alpha masks are unique to the present invention compared to the method described by Cok et al. In an alternative embodiment the final pixels values $PSEL\_OUT_k$ of the enhanced image are determined by adaptively blending the new pixels values $PSEL_k$ with the original pixels values $PSEL\_IN_k$ for each channel k.

$$PSEL\_OUT_k = \alpha PSEL_k + (1-\alpha) PSEL\_IN_k \quad (EQ.\ 16)$$

Figure 17:
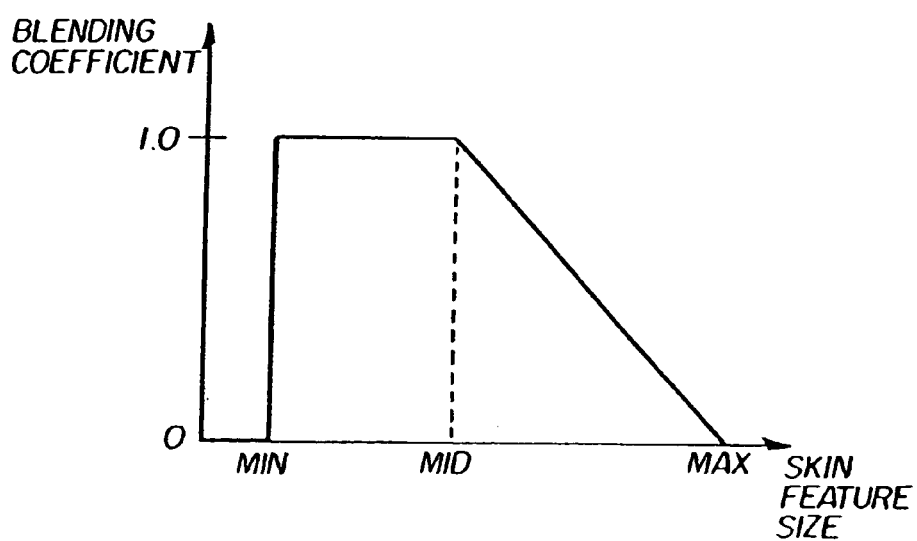
FIG. 17 is an illustration of a blending function used in the skin texture enhancing filter.

The blending coefficient α used to blend the new and original pixel values is dependent upon the characteristics of the of the skin feature that the pixel originated from. For example, as shown in FIG. 17, the blending coefficient α can be a function of the size of the skin feature that the pixel originated from. Referring to FIG. 17, for small skin feature size whose size is less than min the original pixels values are not modified. For the skin features whose size are between min and mid the new pixels values are used as the final pixel values. And for large skin features whose size is greater than mid the final pixels values are determined by blending the new and original pixels values. The values of min, mid and max are one of the parameters of the texture enhancement filter that control the look of the resulting texture enhancement, e.g., the greater the value of min the more skin texture that is preserved in the enhanced skin regions. The greater the value of mid the more that wrinkles and blemishes are removed from the enhanced skin regions. Decreasing the min value and increasing the mid value results in increased smoothness of the enhanced skin. In the interactive embodiment of the present invention the values of min, mid and max are modified by means of the texture enhancer slider 92 of the GUI 78. In one preferred embodiment, the min, mid, and max values for the blending function shown in FIG. 17 are determined by the distance between the eyes.

In another embodiment of the present invention, each of the values min, mid and max can be controlled by a separate slider in the interactive mode. Some skin regions may require higher level of smoothing than the other, e.g. forehead vs. cheeks vs. under eye regions. To solve this problem in one embodiment of the present invention the same blending function showed in FIG. 17 is used for all the skin regions but min, mid and max parameters depend on the region of the skin. In another embodiment of the present invention differently shaped blending functions and parameters different than min, mid, max can be defined for different skin regions to create a desired look. Some skin features may have the same size and be located in the same skin region but they should have very different blending coefficients. As mentioned before some specific skin features may be excluded from any texture enhancement (α=0) to preserve a certain look and/or to preserve facial symmetry (e.g. nasolabial lines). In certain regions, (e.g., around the eyes), it is sometimes preferable not to entirely remove a skin feature but to modify its harsh appearance. Thus in another embodiment, the blending coefficient α is also dependent upon the type of the skin feature and region of the skin where it is located. The skin features can be analyzed based on their shape, color, location, etc. and classified into different types like blemish, mole, laugh line, crow feet wrinkle, etc. and the different blending functions applied for different types of skin features. The blending functions for some skin features like creases under the eyes can be different for the right and left side of the face to match in a symmetrical way the look of the skin features on both sides of the face after applying enhancement (e.g. darkness, softness etc.). Different methods of calculating new pixel values $PSEL_k$ are described later. If the selected feature pixel PSEL is not the last feature pixel (step 1046), then the next feature pixel is selected (step 1048) and the process is repeated starting with step 1008. Otherwise the whole process is completed (step 1050).

Figure 11:
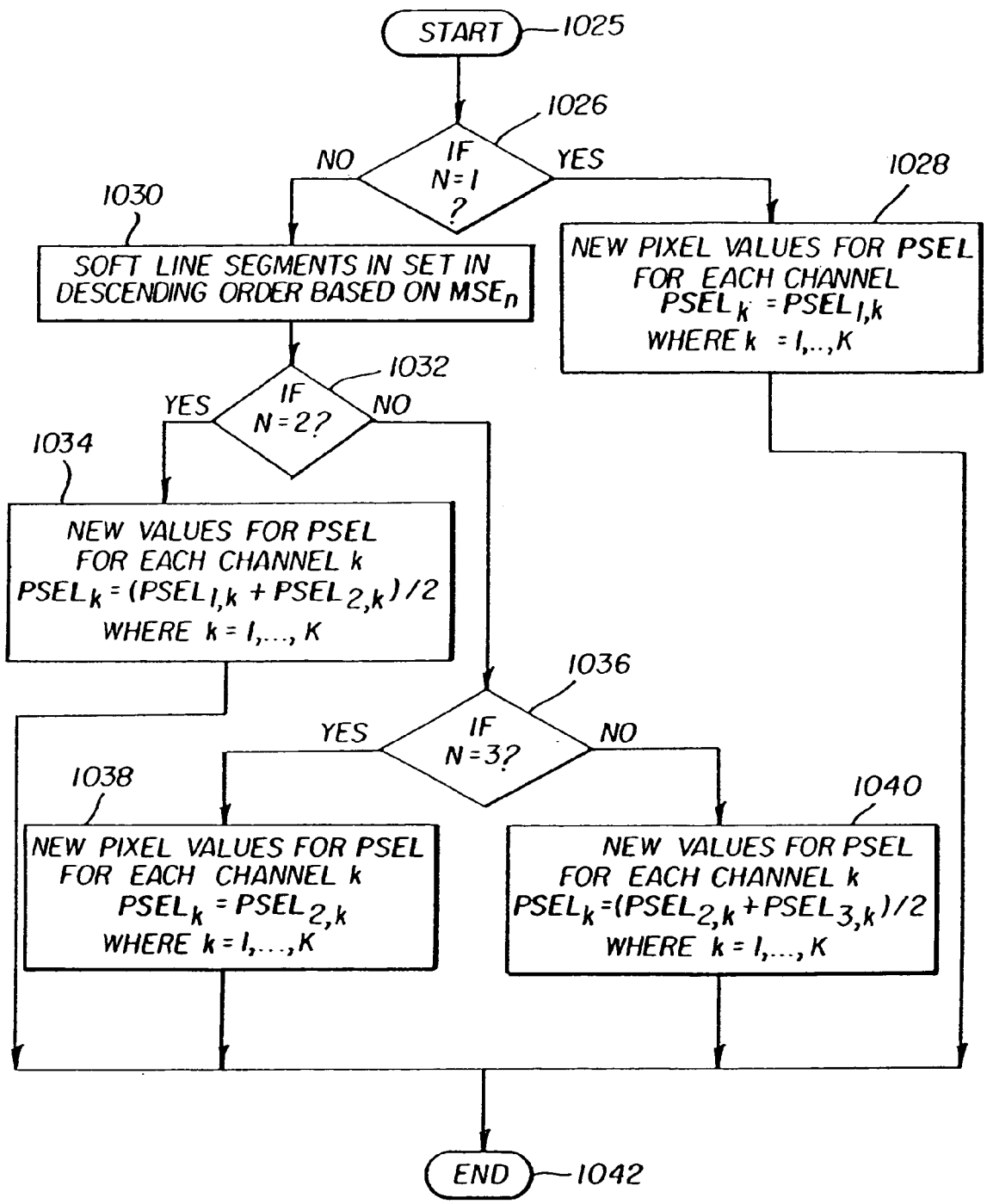
FIG. 11 is a flow chart illustrating a preferred embodiment for calculating new pixel values in the process illustrated in FIG. 10.

In the preferred embodiment where the number of line segments NL is equal to 4, the step of calculating new values $PSEL_k$ for the selected feature pixel PSEL (step 1024 in FIG. 10) is shown in detail in FIG. 11. The method presented here in FIG. 11 is unique to the present invention compared to the method described by Cok et al. It is assumed there is at least one valid line segment in SET (N>0). Referring to FIG. 11, if number of valid line segments N in SET is equal to 1 (step 1026), then new values $PSEL_k$ for each channel k are equal to values $PSEL_{1,k}$ calculated for that line segment (step 1028). Otherwise in step 1030, SET of valid line segments is sorted in descending order based on mean square root error value $MSE_n$ for each line segment n. As a result of sorting in step 1030, the first valid line segment in SET (n=1) has the highest mean square root error and the last valid line segment (n=N) has the lowest mean square root error in SET. If the number of valid line segments N in SET is equal to 2 (step 1032), then new values $PSEL_k$ for each channel k are equal to averaged values of $PSEL_{1,k}$ and $PSEL_{2,k}$ (step 1034). Otherwise, if the number of valid line segments N in SET is equal to 3 (step 1036), then new values $PSEL_k$ for each channel k are equal to values of $PSEL_{2,k}$ calculated for the valid line segment with the mid value of mean square root error (n=2) (step 1038). Otherwise, the number of valid line segments N is equal to 4, and new values $PSEL_k$ for each channel k are equal to averaged values of $PSEL_{2,k}$ and $PSEL_{3,k}$ (step 1040). The final pixel values of the enhanced image are calculated by blending new pixel values $PSEL_k$ for each channel k with the original pixel values (step 1024) according to alpha masks generated in the previous sections.

In a second embodiment for calculating new pixel values, new values $PSEL_k$ for each channel k (step 1024 in FIG. 10) are calculated in the following way. First, weight values $W_{n,k}$ are calculated for each line segment n for each channel k according to the equation EQ. 17.

$$W_{n,k} = 1 - \frac{MSE_{n,k}}{\sum_{i=1}^{N} MSE_{i,k}} \quad \text{where } n = 1, \ldots, N \ k = 1, \ldots, K \quad (EQ.\ 17)$$

Next, new values $PSEL_k$ are calculated for each channel as a weighted sum of $PSEL_{n,k}$ values determined for each valid line segment n and for each channel k according to the equation EQ. 18.

$$PSEL_k = \frac{\sum_{n=1}^{N} W_{n,k} PSEL_{n,k}}{\sum_{n=1}^{N} W_{n,k}} \quad \text{(EQ. 18)}$$

The final pixel values of the enhanced image are calculated by blending new pixel values $PSEL_k$ for each channel k with the original pixel values according to alpha masks (step 1024) generated in the previous sections. The blending operation and alpha masks are unique to the present invention compared to the method described by Cok et al.

When a large amount of texture enhancing is applied to the skin the resulting skin texture can be very smooth and uniform across the whole face. Heavy enhancing of the face to remove severe acne can leave the face very smooth. Depending upon the desired look of the enhanced image, skin that lacks fine scale structure may or may not be acceptable. This is especially true for images where the resulting smoothness of the enhanced image varies abruptly across different regions of the face. If regions of the skin appear to be too smooth or devoid of texture after applying the pinwheel interpolation then if desired idealize texture can be added back to these regions to give an acceptable appearance. The function of the idealized texture is to generate a visually appealing image when the idealized texture is applied to the smooth regions of the skin.

The idealized texture can be correlated or uncorrelated noise, texture obtained from skin, or a visually similar texture pattern. Idealized skin texture can be directly extracted from photographs of individuals with good skin texture or can be generated from representative images of skin texture using texture synthesis techniques as described in "Pyramid-Based Texture Analysis/Synthesis", *Computer Graphics Proceedings*, pages 229–238, 1995. Alternatively, idealized texture can be generated directly from individuals as described in "Real-time, Photo-realistic, Physically Based Rendering of Fine Scale Human Skin Structure", A. Haro, B. Guenter, and I. Essa, *Proceedings 12th Eurographics Workshop on Rendering*, London, England, June 2001. In a presently preferred embodiment, in order to generate a visually appealing image it is desirable to spatially scale the idealized texture based upon the size of the face. Specifically, the separation between the eyes is used to determine the scaling factor.

In its simplest embodiment, the skin region can be retexturized by adding the idealized texture uniformly across the skin region delineated by the feature points 420

$$S_{out}(x,y) = S_{in}(x,y) + \gamma \text{Tex}(x,y) \quad \text{(EQ. 19)}$$

where $S_{in}(x, y)$ is the skin pixel at location (x,y) before retexturing, $S_{out}(x, y)$ is the skin pixel after retexturing, Tex(x,y) is the texture component to be added to the skin at pixel (x,y), and γ is a scaling factor. The retexturing operation is applied to all the color channels. If desired, the magnitude of the texture added to the skin can be set to be a function of the level of enhancement. Referring to the retexturing curves shown in FIG. 21*a*, as the level of enhancement is increased the amount of texture added to the skin region is also increased. In an interactive embodiment, the amount of texture added to the skin can be tied to the texture enhancement slider 92. By varying the shape and magnitude of the retexturing curve different appearances can be imparted to the enhanced skin.

The texture component is a high frequency component that fluctuates around zero. The texture component can also vary as a function of the skin location. The appearance of the fine scale structure of skin varies smoothly across the face yet each region of the skin has a very distinct appearance. For example, forehead fine scale structure is distinctly different from nose fine scale structure.

In a preferred embodiment, retexturing can be applied adaptively to the skin based upon the local smoothness of the skin $$S_{out}(x,y) = S_{in}(x,y) + \gamma(x,y)\text{Tex}(x,y) \quad \text{(EQ. 20)}$$

where the scaling factor γ(x, y) is a function of the smoothness of the skin ss(x,y) at pixel location (x,y). Any number of statistical texture measures or high pass filters can be used to measure the local smoothness of the skin ss(x,y). For example, variance filters, edge filters, second difference filters, etc. are useful in calculating the local smoothness of the skin. Referring to FIG. 21*b*, there are shown two representative retexturing functions useful in practicing the current invention. As the local smoothness of the skin increases the scaling factor γ also increases thus causing a larger amount of texture to be added to the skin. By changing the shape and magnitude of the retexturing function different appearances can be imparted to enhanced skin, The majority of the skin features that we wish to modify correspond to valley features i.e., a dark area surrounded by a light area. In most instances, skin features are going to be modified regardless of the color information associated with the pixels that have been identified as skin features, albeit there may be instances where an individual may not want a defining facial characteristic such as a beauty mark to be removed from the photograph of the individual. In these instances, the color information associated with the skin feature pixels can be used in determining the type of skin feature that should or should not be removed. An alternative approach is to build a tool into the Graphical User Interface that will allow the operator to undo an undesirable modification (e.g., the removal of a desirable beauty mark). In a preferred embodiment, the user chooses an undo/redo tool from the graphical list of tools 84, and moves the undo/redo tool via pointing device 40 such as a mouse to the location of the skin feature in the original image 80 the user wishes to restore. Clicking on the skin feature in the original image 80, which is displayed on the left, causes the feature to be added back to the enhanced image 82, which is displayed on the right. Clicking again on the restored skin feature in the original image now causes the skin feature to be removed from the enhanced image. Thus, the undo/redo tool works, toggling back and forth, by either removing a skin feature from the enhanced image if it is present in the enhanced image or restores it to the enhanced image if it is not present in the enhanced image. In an alternative embodiment, the texture enhancer slider 92 can be set to no enhancement and the tool 84 can be used to allow the user to choose which skin features to remove.

In another embodiment, the graphical user interface acquires and displays a digital image containing one or more faces. A skin feature map is generated by use of any of the aforementioned techniques to identify and map the skin features; the skin feature map therefore represents the skin features on the one or more faces in the digital image. The pointing device 40 is then used to point to a particular skin feature. In response to a point and click operation of the pointing device, the skin feature map is referenced as to the particular feature and the appropriate enhancement for that feature, provided by an appropriate enhancement filter, is initiated for the skin feature being pointed at.

Skin Tone Enhancement Filter.

The task of the skin tone enhancing filter 620 (FIG. 6) is to improve the overall appearance of the skin tone. The skin tone filter evens out unbalanced skin tone and creates a more even colored skin tone. In addition, the skin tone filter is used to modify the color of the skin tone to produce a more desirable skin color representation. This corresponds to modifying both the luminance and chrominance of the skin to match individual and culture preferences of skin tone rendition. Moreover, skin tone problems tend to be on a larger spatial scale than texture. It is important not to even out the skin tone too much because faces without highlights or shadows are flat and tend to be uninteresting.

Figure 13:
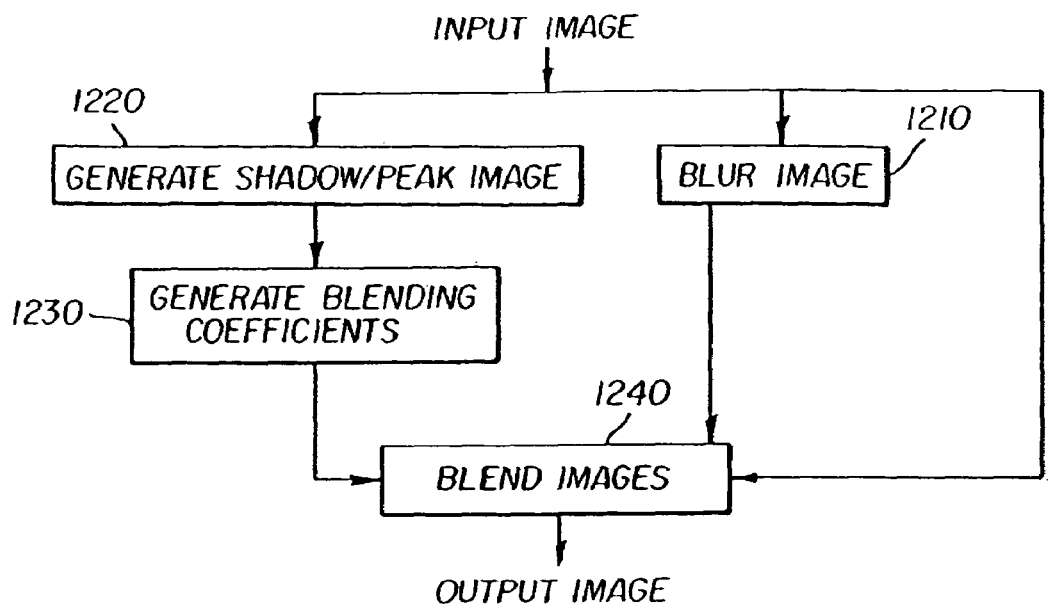
FIG. 13 is a flow chart of a presently preferred embodiment of the skin tone enhancing filter as shown in FIG. 6.

Referring to FIG. 13, there is shown a flowchart for a presently preferred embodiment of a skin tone enhancing filter according to the present invention. The skin tone-enhancing filter adaptively compresses highlights and shadows by adaptively blending (in a blending step 1240) the input image I(x) with a blurred version $I_b(x)$ of the input image obtained from a blending step 1210, as follows.

$$O(x)=\alpha(x)I_b(x)+(1-\alpha(x))I(x) \qquad (EQ.\ 21)$$

where $\alpha(x)$ is a blending coefficient obtained from a coefficient generation step 1230 and x=(x,y) is the location of a pixel. The blending operation is applied to all the color channels. The blending coefficient is a function of the shadow/highlight SH(x) strength image at x obtained from the shadow/peak generation step 1220, as follows.

$$\alpha(x)=f[SH(x)] \qquad (EQ.\ 22)$$

Figure 14:
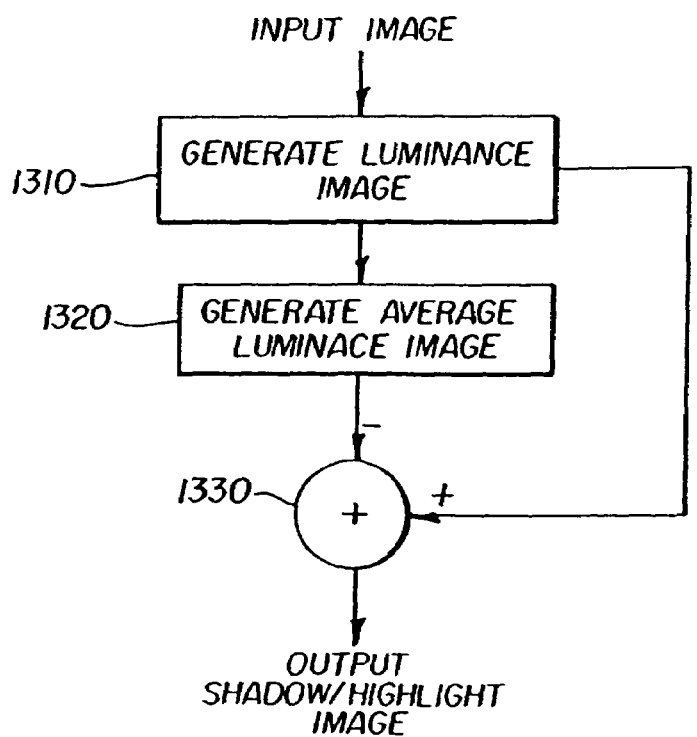
FIG. 14 is a flow chart of a presently preferred embodiment of the calculation of shadow/highlight strength for use in the skin tone enhancing filter shown in FIG. 13.

Referring to FIG. 14, there is shown a presently preferred embodiment of calculating the shadow/highlight strength image according to the present invention. The shadow/highlight strength image from step 1220 is generated by subtracting an average luminance image 1320 from a luminance image 1310. The luminance image is calculated by using equation EQ. 2. The average luminance image can be either a local average luminance image or a global average luminance. A local average luminance image can be generated by applying a blur filter such as a Gaussian or box filter to the luminance image, whereas the global average luminance is calculated by determining the average luminance of the skin within the skin region delineated by the feature points. The shadow/highlight strength is analogous to a valley/peak image when using the local average image to calculate the shadow/highlight image. In a preferred embodiment, the blur radius used to calculate the shadow/highlight map should be larger than the blur radius or extent of the valley/peak detector used in the texture enhancing filter. In either case, the blur radius is dependent upon the size of the face (which is an example of a default parameter).

Figure 15A:
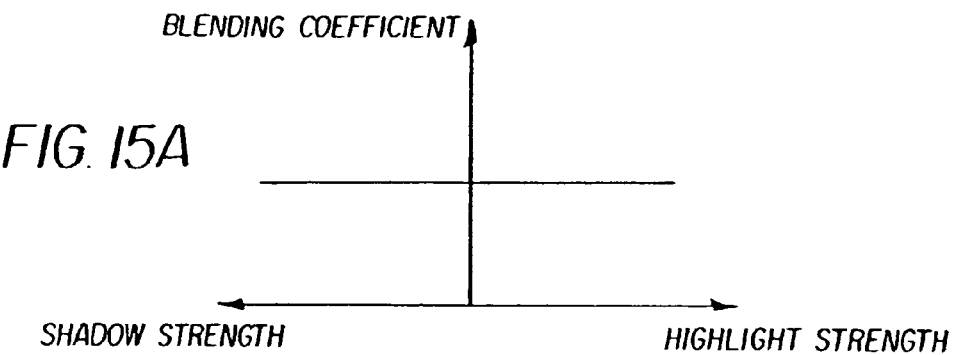
FIGS. 15A, 15B and 15C are illustrations of several functions showing the effect of different blending coefficients used in the skin enhancing filter shown in FIG. 13.
Figure 15B:
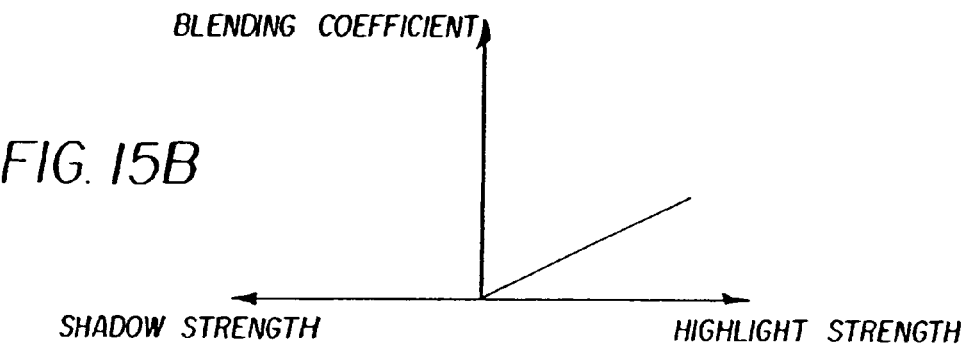
Figure 15C:
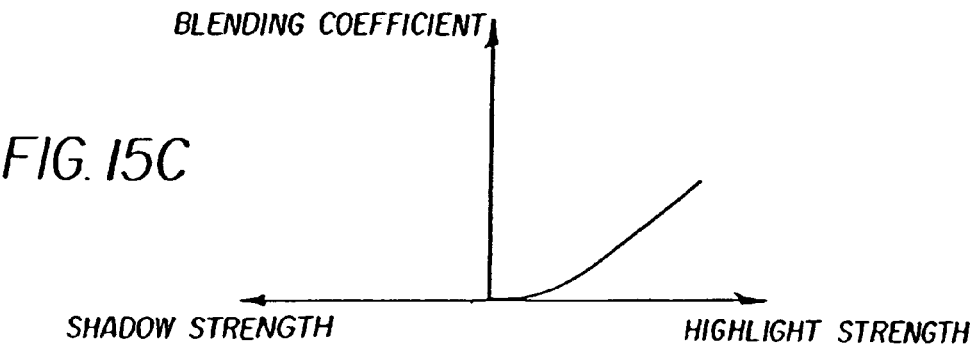

In its simplest embodiment, the blending coefficient is a constant $f[SH(x)]=\alpha(x)=\alpha$, which is an example of a default parameter, and is not dependent upon the shadow/highlight strength image as shown in FIG. 15A. The blending functions shown in FIG. 15B and 15C are useful for toning down highlights and hot spots caused by lights and/or oily skin, while leaving shadow regions unchanged.

The skin tone filter can also be used to modify the color rendition of the skin. In a presently preferred embodiment, the color C of a region such as the skin region can be modified $C_{mod}$ by shifting the mean and variance of the color distribution of a region as follows $$C_{mod}(x,y)=k(C(x,y)-\overline{C})+C_{preferred}(x,y) \qquad (EQ.\ 23)$$

where the vector C(x,y) corresponds to the pixel's red (R), green (G), and blue (B) signal, $C_{preferred}$ is the preferred color vector, $\overline{C}$ is the current mean color vector, and k is a constant that can vary between 0 and 1. The preferred color $C_{preferred}(x,y)$ can vary spatially depending upon the region of the skin to be modified.

A preferred embodiment for lightening or darken the skin region is to modify the contrast of the skin region as follows $$C_{mod}(x,y)=C^{\gamma}(x,y) \qquad (EQ.\ 24)$$

where values of $\gamma$ less than one correspond to lightening the skin color and values of $\gamma$ greater than one correspond to darkening the skin color.

An alternative embodiment for lightening the skin region is given by $$C_{mod} = \frac{C}{1-\gamma(1-C)} \qquad (EQ.\ 25)$$

and for darkening the skin region is given by $$C_{mod} = 1 - \frac{1-C}{1-\gamma C} \qquad (EQ.\ 26)$$

where $\gamma$ varies between 0 and 1.

The above approach is also applicable when C is represented in other color spaces, e.g., CIELAB, YUV, HSV, etc. In addition, these equation can be applied to all or a subset of the components of C. This is particularly true when C is represented in a color space (e.g., CIELAB) where the components are related to the luminance (L*) and chrominance (a*b*).

Teeth and Eye Enhancing Filter.

Figure 16:
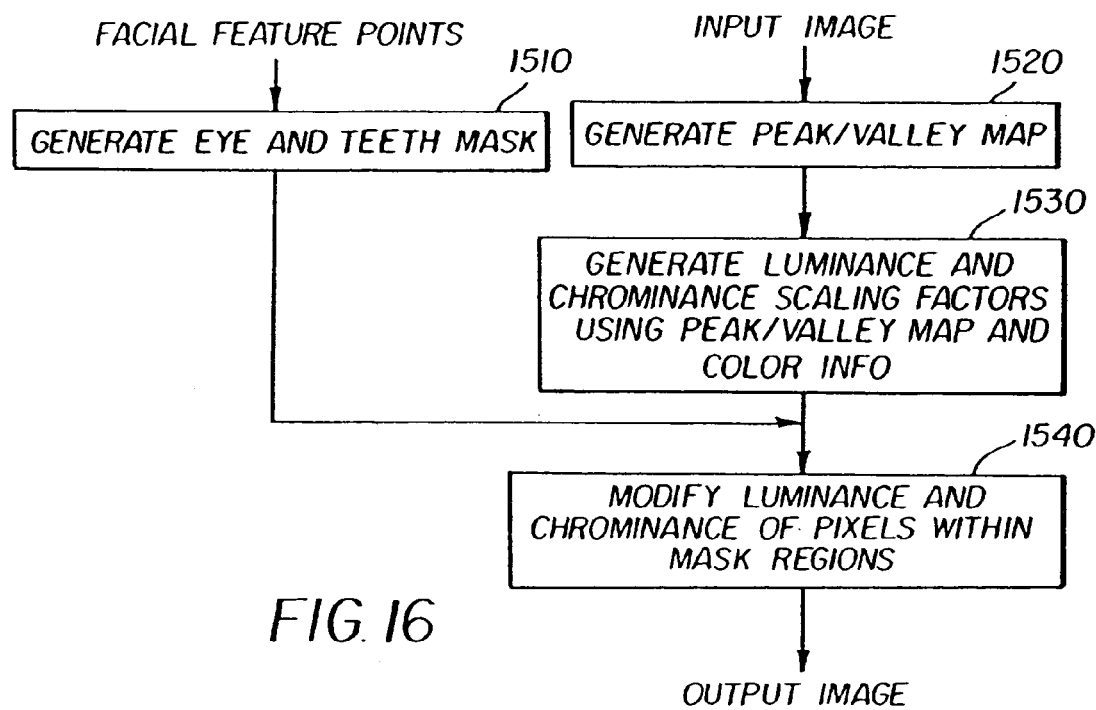
FIG. 16 is a flow chart of a presently preferred embodiment of the teeth and eye enhancing filters shown in FIG. 6.

The task of the teeth and eye enhancing filter(s) 630 and 640 (FIG. 6) is to increase the luminance and whiteness of the teeth and eyes. Referring to FIG. 16, there is shown a flowchart for a presently preferred embodiment of a teeth and eye whitening filter according to the present invention. At an eye/teeth mask generation step 1510, the salient facial feature points 420 (FIG. 4) are used to generate a mask that identifies pixels that correspond to the eye and teeth regions. Using the input image at a valley/peak map generation step 1520, the valley/peak map is generated using Eq. 14 where the radius of the blur is determined by the eye separation (which is an example of a default parameter). At a scaling factor generation step 1530, the valley/peak map and the color information are used to calculate scaling factors (which are examples of default parameters) for the luminance and chrominance values of the pixels within the eye and teeth masks Then at a pixel modification step 1540, the scaling factors are applied to the luminance and chrominance values of the pixels within eye and teeth regions generating new luminance and chrominance values.

In a presently preferred embodiment, the RGB values for pixels within the mask regions are converted to CIELAB (L*a*b*) space and the luminance and chrominance values are modified as follows, $$L^* = L^* \cdot (1+kP) \quad \text{(EQ. 27)}$$

$$a^* = a^*/(1+kP) \quad \text{(EQ. 28)}$$

$$b^* = b^*/(1+kP) \quad \text{(EQ. 29)}$$

where k is the aforementioned default parameter and P is the probability that the pixel belongs either to the whites of the eyes or to a tooth. A presently preferred expression for the probability P is as follows, $$P = \begin{cases} 1 - \left|\frac{F}{\beta}\right| & \text{if } -\beta \le F \le 0 \\ 0 & \text{otherwise} \end{cases} \quad \text{(EQ. 30)}$$

where F is calculated using Eq. 14 with a blur radius chosen as a function of the face size and $\beta$ is a threshold.

In some images the colors of the teeth are very uneven and/or the colors of the whites of the two individual eyes are significantly different from each other. In these cases, increasing the luminance and whiteness of the teeth and eyes may have an unwanted deleterious effect of accentuating the uneven color of the teeth and/or eyes. Balancing the color and uniformity of the teeth and eyes usually increases the subjective acceptability of the picture of a given face.

A presently preferred embodiment for balancing the color and uniformity of the teeth and whites of the eyes is based upon the technique used to modify the color rendition of the skin (see above). The color C of the pixels defining the teeth or whites of the eye can be modified $C_{mod}$ by shifting the mean and variance of the color distribution of these pixels according to Eq. 23. Where the vector C(x,y) corresponds to the pixel's color signal (L,a,b), $C_{preferred}$ is the preferred color vector $(L_p, a_p, b_p)$ $\overline{C}$ is the current mean color vector $(\overline{L}, \overline{a}, \overline{b})$ and k is a constant that can vary between 0 and 1. As indicated by Eq. 23, this modification can be applied to all three color channels or alternatively to a subset of the color channels (e.q only the L channel). To increase the brightness and whiteness the preferred color should be chosen so that $L_p > \overline{L}$ and the color saturation of the preferred color is less than the color saturation of the mean color vector. To equalize the whites of the two eyes, the same preferred color can be used for both eyes or alternatively the preferred color of each eye is different but the color different between them is smaller than the color difference of the mean color vector for each eye.

Shape Enhancement Filter

The task of the shape enhancing filter 650 (shown in FIG. 6) is to modify the shape of facial features such as the eyes, nose and mouth. The shapes of the facial feature are enhanced by modifying their shape using standard warping techniques. An example of a warping technique useful for practicing the current invention is given by T. Beier and S. Neely. Feature-Based Image Metamorphosis, *Computer Graphics*, 26(2): 35–42, New York, N.Y., July, 1992, Proceedings of SIGGRAPH '92, which is incorporated herein by reference.

The shape modification is designed to create a more preferred look of the face. For example, if the eyes are slightly closed in the image it may be preferable to open them to some degree by using morphing techniques. Also enhancing symmetry of the facial features usually increases subjective acceptability of the picture of a given face. For example, by equalizing the shape of both eyes the picture of the face usually has higher subjective acceptability. In the same manner, changing shape of a mouth may create more a preferred look by modifying overall facial expression.

Figure 18:
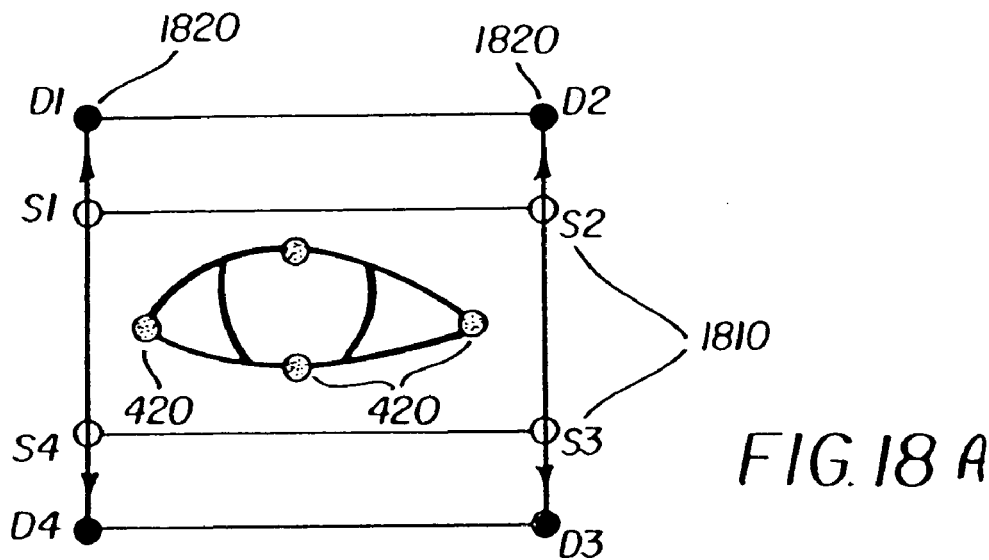
FIGS. 18A and 18B are pictorial examples of the control points used in making a shape adjustment of an eye.
Figure 19:
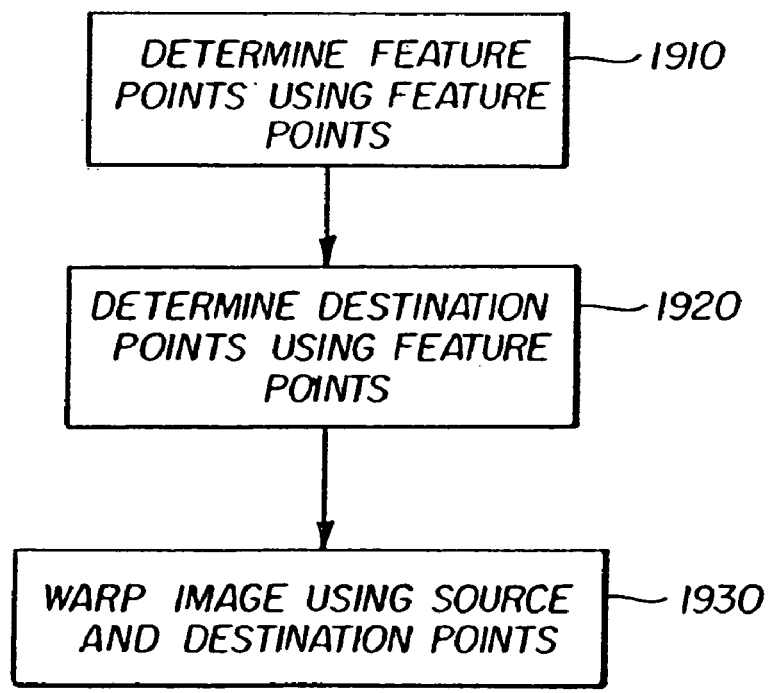
FIG. 19 is a flowchart for a presently preferred embodiment of a shape enhancing filter as shown in FIG. 6.
Figure 18B:
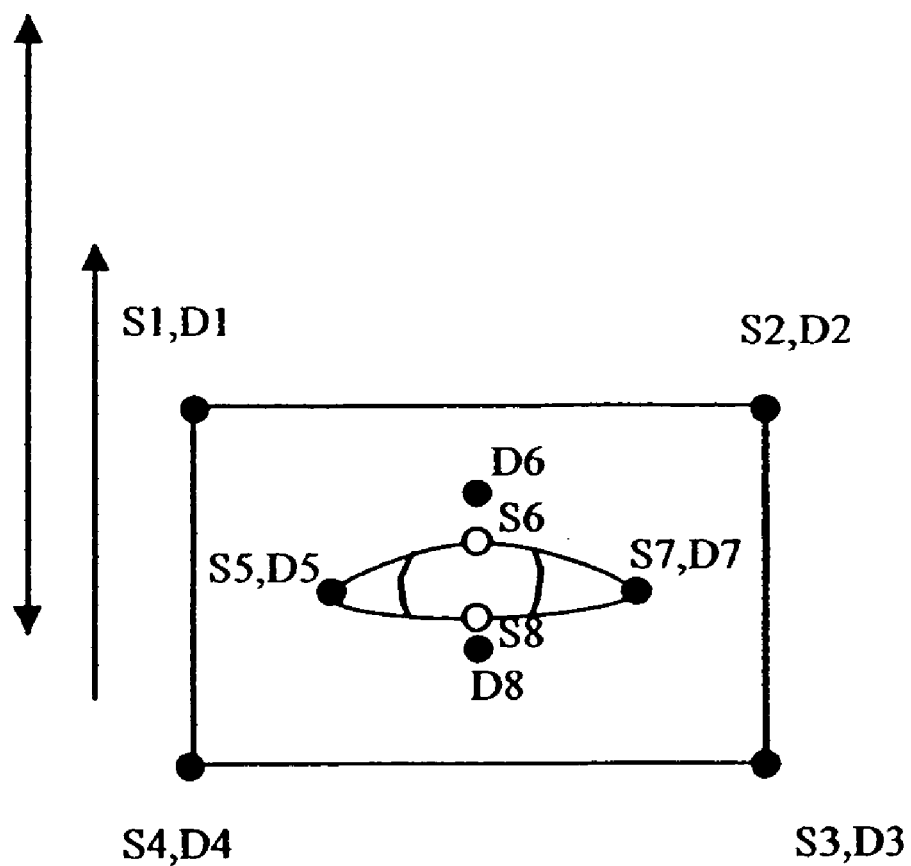
Figure 20:
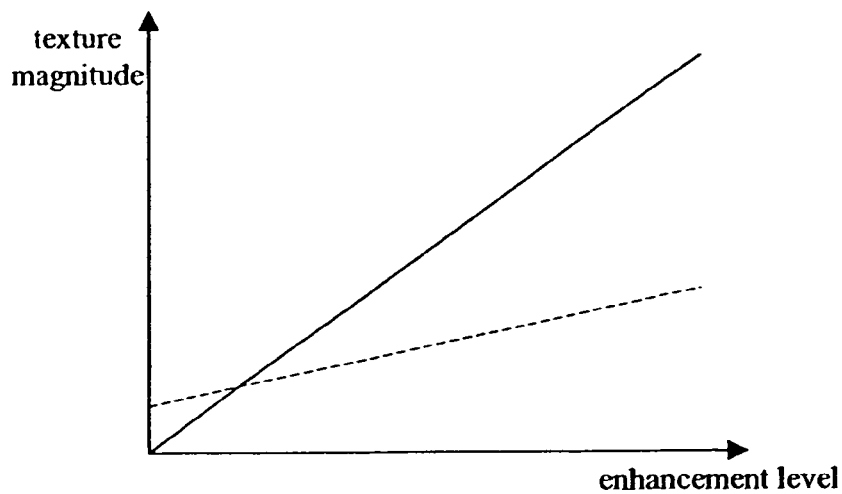
FIGS. 20A and 20B show retexturing curves where (FIG. 21A) the retexturing is a function of the level of enhancement and where (FIG. 21B) the retexturing is a function of the local smoothness of skin.
Figure 20:
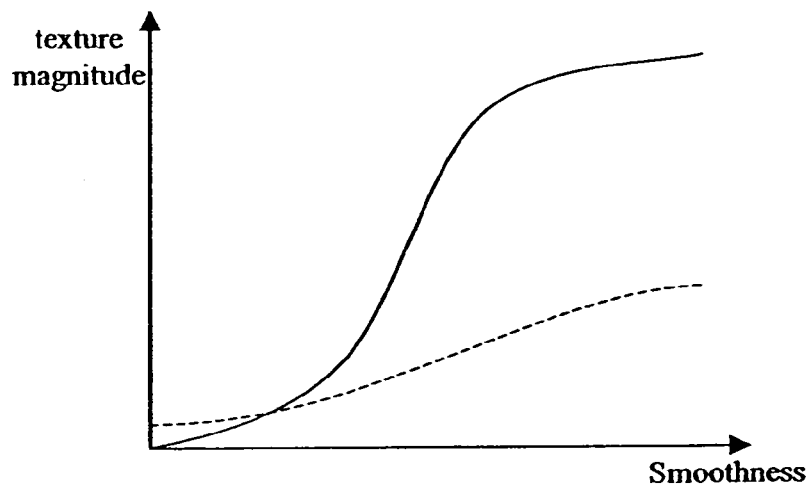

Referring to FIG. 19, there is shown a flowchart for a presently preferred embodiment of a shape enhancing filter 650 according to the present invention. At a source control point determination step 1910, the source control points 1810 (see FIG. 18A) that are used for warping the image are determined by the feature points 420 (see FIG. 4) delineating the facial feature (e.g., eye) to be shape enhanced. In a destination control point determination step 1920, the destination control points 1820 are determined. The location of destination control points 1820 defines the new location of the source control points 1810 in the shape modified image. The destination control points 1820 (D1, D2, D3, and D4) are respectively the new locations of the source control points 1810 (S1, S2, S3, and S4). In a warping step 1930, the source and destination control points are used to warp the image. The location of the destination control points 1820 are defined by the desired change of the facial feature shape. For example, if it is desired to increase the size of the eyes the destination control points 1820 are positioned as shown in FIG. 18A. To better control shape changes some of the control points may include feature points as shown in FIG. 18B. Source control points S5, S6, S7, S8 are corresponding to eye feature points. The destination control points D5, D6, D7, D8 are defining a new eye shape created as a result of warping. Source and destination control points S1 and D1, S2 and D2, S3 and D3, S4 and D4 are the same to limit changes created by warping to the area within the bounding rectangle (S1, S2, S3, S4). In the preferred embodiment, to equalize shape of the eyes, destination control points (D5, D6, D7, D8) of one eye must match relative locations of feature points of the other eye. In the preferred embodiment, when changing shape of the eyes (e.g. opening eyes) the destination control points for left eye (D5, D6, D7, D8) and destination control points for the right eye (D5',D6',D7',D8', i. e., where the reference characters are the same as those used as FIG. 18B but primed (') to refer to the right eye) are defined in the way to ensure equal changes in shape for both eyes by matching lengths and directions of corresponding line segments between left and right eye [S5, D5] and [S5',D5'], [S6, D6] and [S6',D6'], [S7, D7] and [S7',D7'], [S8, D8] and [S8',D8'].

In a presently preferred embodiment, the parameters of the shape enhancing filter are used to define whether the facial feature shape is increased or decreased by specifying the location of the destination control points 1820. The shape enhancing filter can be incorporated into the GUI screen 78 (see FIG. 1B) through an additional slider control. Moreover, there may be a unique shape enhancing slider for each facial feature. The system maps the position of the slider into appropriate parameter values of the shape enhancement filters. Moving the slider in one direction causes the facial feature to decrease in size while moving the slider in the opposite direction causes the facial feature to increase in size. Because symmetry is very important for facial appearance, in the preferred embodiment when manipulating shape of symmetrical facial features as eyes the shape symmetry is ensured as described above. The default position of the respective slider thus could be a neutral position not effecting any shape enhancement (until the slider is moved one way or the other).

Throughout the foregoing description, certain parameters have been specified as candidates for system default parameters, which, e.g., determine the initial settings of the enhancement filters and the initial settings of the enhancement sliders used in the graphical user interface. These parameters have been selected without limitation as examples of appropriate default parameters and should not be seen as a definitive or limiting set of parameters. It should be clear to one of ordinary skill in this art that many other parameters, including others cited in this description, could be chosen and/or designated as default parameters.

PARTS LIST 10 system
12 personal computer (PC)
20 storage media
28 scanner
30 digital camera
40 input devices
50 display monitor
60 printer
62 server
65 storage media
70 communication network
78 graphical user interface (GUI) screen
80 original image
82 enhanced image
90 appearance enhancer
92 texture enhancer
94 skin enhancer
96 eye enhancer
98 teeth enhancer
200 initiation step
205 acquisition and display step
210 locate step
215 display step
220 decision step
225 modify step
230 default setup step
235 execution step
240 user selection step
245 display step
250 decision step
255 local print step
260 local archive step
265 remote print step
270 remote archive step
275 query step
280 ending step
282 acquisition step
284 face detection and location step
286 enhancement selection step
288 enhancement execution step
290 face query step
292 storage step
294 image query step
310 face detection module
315 facial feature detector
410 detected face
420 salient feature points
550 generic mapping step
554 scaling step
556 skin color mapping step
558 map combination step
570 central region with generic mask
572 border region
574 outline of neck probability map
576 central region
610 skin texture enhancement filter
620 skin tone enhancement filter
630 teeth enhancement filter
640 eye enhancement filter
650 facial feature shape enhancement filter
670 forehead bounding region defined
672 step of creating probability feature maps
674 step of combining probability maps
710 skin feature generation step
720 feature modification step
810 feature selection step
820 dilation step
830 filtering step
910 face boundary
920 dilated features
930 line segments
940 feature pixel
1002-
1190 pinwheel filter steps
1210 blurring step
1220 shadow/peak generation step
1230 coefficient generation step
1240 blending step
1310 luminance image
1320 average luminance image
1330 subtracting step
1510 eye/teeth mask generating step
1520 valley/peak map generating step
1530 scaling factor generation step
1540 pixel modification step
1810 source control points
1820 destination control points
1910 source control point determination step
1920 destination control point determination step
1930 warping step
2000 acquisition step
2010 display step
2020 accept/reject decision step
2030 interactive retouching mode
2040 accept/reject decision step
2050 cleanup step
2060 query step
2100 fulfillment initiation
2105 acquisition step
2110 face detection
2120 face suitability decision
2130 filter execution step
2140 enhanced image display
2150 image acceptability decision
2160 enhanced decision
2170 interactive enhancement step
2180 display non-face image
2190 conventional image fulfillment kiosk processing

What is claimed is:

1. A method for enhancing an appearance of a face located in a digital image, wherein the appearance includes one or more symmetrical features, said method comprising the steps of:
   (a) acquiring an original digital image containing one or more faces;
   (b) detecting a location of facial feature points in the one or more faces, said facial feature points including points identifying salient symmetrical features including one or more of skin, eyes, eyebrows, nose, mouth, and hair;
   (c) using the location of the facial feature points to segment the face into different regions, said different regions including one or more of skin, eyes, eyebrows, nose, mouth, neck and hair regions;

(d) determining one or more facially relevant characteristics of the different regions;

(e) based on the facially relevant characteristics of the different regions, selecting (1) one or more enhancement filters each customized especially for a particular region and (2) the default parameters for the enhancement filters; and (f) executing the enhancement filters on the particular regions in a proportional manner to account for symmetry between the facially relevant characteristics of the different regions, thereby producing an enhanced digital image from the original digital image.

2. The method as claimed in claim 1 wherein the enhancement filters employed in step (f) either preserve symmetry or improve symmetry between facially relevant characteristics of the different regions.

3. A computer storage medium having instructions stored therein for causing a computer to perform the method of claim 1.

4. A method for enhancing the shape of symmetrical features appearing in a face located in a digital image, said method comprising the steps of:

(a) acquiring a digital image containing one or more faces;

(b) detecting a location of facial feature points in the one or more faces, said facial feature points including points identifying a pair of salient symmetrical features amenable to shape adjustment;

(c) using the facial feature points to determine two or more source points that are positioned relative to the salient features;

(d) using the facial feature points to determine two or more destination points which determine the desired change of the salient features; and (e) warping the shape of the salient feature by using the source points and the destination points in a manner that substantially equalizes changes in shape for the pair of symmetrical features.

5. The method as claimed in claim 4 wherein the pair of salient symmetrical features is a pair of eyes.

6. The method as claimed in claim 4 further including providing a user interface having a slider that is adjustable to vary the amount of shape enhancement.

7. A computer storage medium having instructions stored therein for causing a computer to perform the method of claim 4.

8. The method of claim 1 wherein said enhancement filters enhance at least one of texture and shape.

9. A method for enhancing an appearance of a face located in a digital image, said method comprising the steps of:

detecting a location of facial feature points in the face, said facial feature points identifying one or more symmetric facial features;

selecting one or more enhancement filters to be applied to one or more of said facial features; and executing said one or more enhancement filters on respective said facial features in a manner wherein symmetry of said facial features is preserved or improved.

10. The method of claim 9 wherein said facial features include one or more of skin, eyes, eyebrows, nose, mouth, neck, and hair and said enhancement filters include one or more of blending and warping.

11. The method of claim 9 further comprising:

using the location of the facial feature points to segment the face into different regions; and determining one or more facially relevant characteristics of the different regions; and wherein said executing further comprises selecting one or more enhancement filters each customized especially for a respective said region and selecting default parameters of said enhancement filters based on the facially relevant characteristics of the different regions.

12. The method of claim 9 further comprising:

using said facial feature points to determine two or more source points that are positioned about one of said facial features;

using the facial feature points to determine two or more destination points; and wherein said executing further comprises warping the shape of the respective said facial feature using said source points and said destination points in a symmetrical manner that substantially equalizes changes in shape of for the pair of symmetrical features.

13. The method of claim 9 wherein said selecting further comprises selecting one of a pair of said facial features and said executing further comprises executing the respective said enhancement filter on both of said facial features of said pair.

14. The method of claim 13 wherein said facial features are eyes or eyebrows.

15. A computer storage medium having instructions stored therein for causing a computer to perform the method of claim 8.

16. A system for enhancing an appearance of a face located in a digital image, said method comprising:

means for detecting a location of facial feature points in the face, said facial feature points identifying one or more symmetric facial features;

means for selecting one or more enhancement filters to be applied to one or more of said facial features; and means for executing said one or more enhancement filters on respective said facial features in a manner wherein symmetry of said facial features is preserved or improved.

* * * * *